United States Patent
Lee et al.

(10) Patent No.: US 12,150,609 B2
(45) Date of Patent: Nov. 26, 2024

(54) ROBOT CLEANER AND METHOD FOR OPERATING SAME

(71) Applicant: LG ELECTRONICS INC., Seoul (KR)

(72) Inventors: Minho Lee, Seoul (KR); Junghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 598 days.

(21) Appl. No.: 17/298,727

(22) PCT Filed: Dec. 10, 2019

(86) PCT No.: PCT/KR2019/017350
§ 371 (c)(1),
(2) Date: Jun. 1, 2021

(87) PCT Pub. No.: WO2020/122540
PCT Pub. Date: Jun. 18, 2020

(65) Prior Publication Data
US 2022/0047135 A1 Feb. 17, 2022

(30) Foreign Application Priority Data

Dec. 12, 2018 (KR) .................. 10-2018-0160300
Dec. 12, 2018 (KR) .................. 10-2018-0160301

(51) Int. Cl.
*A47L 11/40* (2006.01)
*G05D 1/00* (2024.01)

(52) U.S. Cl.
CPC ........ *A47L 11/4066* (2013.01); *G05D 1/0219* (2013.01); *G05D 1/0274* (2013.01); *A47L 2201/04* (2013.01)

(58) Field of Classification Search
CPC ............. A47L 11/4066; A47L 2201/04; A47L 9/2805; A47L 9/2847; A47L 9/2852;
(Continued)

(56) References Cited

U.S. PATENT DOCUMENTS 8,452,450 B2  5/2013  Dooley et al.
9,402,518 B2  8/2016  Burlutskiy
(Continued)

FOREIGN PATENT DOCUMENTS

CN  102138769  8/2011
CN  103271699  9/2013
(Continued)

OTHER PUBLICATIONS

Chinese Office Action dated Jan. 21, 2022 issued in Application No. 201980082013.9 (English translation attached).
(Continued)

*Primary Examiner* — Bao Long T Nguyen
(74) *Attorney, Agent, or Firm* — KED & ASSOCIATES, LLP

(57) ABSTRACT

A robot cleaner according to an embodiment of the present invention comprises: a travelling part for moving a body; a memory for storing travel state information of the traveling part, which is recorded while a cleaning operation is performed on the basis of a first map; and a control part for discriminately detecting a first area and a second area divided from a plurality of cleaning areas corresponding to the first map, on the basis of the stored travel state information. Moreover, the control part may generate a second map by removing one of the first area and the second area from the first map, and then control the travelling part to perform a cleaning operation in a changed cleaning mode on the basis of the generated second map.

12 Claims, 14 Drawing Sheets

(58) Field of Classification Search
CPC .. A47L 11/24; A47L 2201/06; A47L 11/4011; A47L 11/4061; G05D 1/0219; G05D 1/0274; G05D 1/0221; G05D 1/0242; G05D 1/0251; G05D 1/0255
See application file for complete search history.

(56) References Cited

U.S. PATENT DOCUMENTS

| 2011/0202175 | A1 | 8/2011 | Romanov et al. |
| 2013/0206177 | A1* | 8/2013 | Burlutskiy ........... G05D 1/0219 15/319 |
| 2014/0122409 | A1 | 5/2014 | Na et al. |
| 2018/0074508 | A1 | 3/2018 | Kleiner et al. |

FOREIGN PATENT DOCUMENTS

| CN | 104055462 | 9/2014 |
| DE | 10-2010-000174 | 7/2011 |
| EP | 3366181 | 8/2018 |
| JP | 2018-061529 | 4/2018 |
| KR | 10-1995-0013455 | 5/1995 |
| KR | 10-2005-0111138 | 11/2005 |
| KR | 10-0638219 | 10/2006 |
| KR | 10-2009-0077547 | 7/2009 |
| KR | 10-2011-0026414 | 3/2011 |
| KR | 10-2013-0091879 | 8/2013 |
| KR | 10-2014-0115891 | 10/2014 |
| KR | 10-1807484 | 12/2017 |

OTHER PUBLICATIONS

Australian Office Action dated Jun. 29, 2022 issued in Application No. 2019399322.
European Search Report dated Aug. 18, 2022 issued in Application No. 19895285.5.
International Search Report dated Mar. 27, 2020 issued in Application No. PCT/KR2019/017350.
Korean Notice of Allowance dated Feb. 26, 2020 issued in Application No. 10-2018-0160300.
Korean Notice of Allowance dated Feb. 26, 2020 issued in Application No. 10-2018-0160301.

* cited by examiner

⬇ ADDED

ROBOT CLEANER AND METHOD FOR OPERATING SAME

CROSS-REFERENCE TO RELATED PATENT APPLICATIONS

This application is a U.S. National Stage Application under 35 U.S.C. § 371 of PCT Application No. PCT/KR2019/017350, filed Dec. 10, 2019, which claims priority to Korean Patent Application Nos. 10-2018-0160300 and 10-2018-0160301, both filed Dec. 12, 2018, whose entire disclosures are hereby incorporated by reference.

BACKGROUND

1. Technical Field

The present disclosure relates to a robot cleaner capable of performing cleaning while driving autonomously, and more specifically, to a robot cleaner capable of performing cleaning while driving autonomously in a cleaning area based on a map, and an operating method thereof.

2. Description of the Related Art

A cleaner is a device that performs cleaning by sucking or mopping dust or foreign materials. In general, the cleaner performs a cleaning function for a floor, and includes wheels for movement. In general, the wheels are rolled by external force applied to the cleaner main body to move the cleaner main body relative to the floor.

However, in recent years, researches on an autonomous cleaner such as a robot cleaner that performs cleaning while driving on its own without a user's manipulation, and a cleaner that moves on its own along a nozzle moved by a user's manipulation have been actively carried out.

With the development of such a robot cleaner performing cleaning while driving by itself without a user's operation, there is a need to develop a plurality of robot cleaners for performing cleaning while any one thereof follows another one thereof or while collaborating with each other without a user's operation.

This robot cleaner initially performs cleaning while searching and moving all unknown areas. Then, afterwards, learning cleaning is performed based on a map generated based on the search.

However, even in the case of learning cleaning, it is designed to clean all areas by considering the coverage of the entire cleaning area as important. Accordingly, in a complex environment such as a plurality of obstacles or an uneven floor condition, cleaning completion time is lengthened, which may be frustrating for the user.

Accordingly, Korean Patent Application Publication No. KR101807484 discloses a method of performing a cleaning operation with a map generated based on sensor information acquired through a sensor provided in a robot cleaner.

However, the method has a disadvantage that it is difficult to apply to a robot cleaner with insufficient sensors, and the accuracy is poor due to various environmental variables.

SUMMARY

Accordingly, an aspect of the present disclosure is to provide a robot cleaner capable of generating a map that is robust to various environmental variables and highly usable without relying on sensors, and an operation method thereof.

Furthermore, another aspect of the present disclosure is to provide a robot cleaner capable of finding cleaning obstruction areas in which the driving of the main body is complicated from an existing map and reflecting them on a new map without relying on sensors, and an operation method thereof.

In addition, still another aspect of the present disclosure is to provide a robot cleaner capable of finding cleaning obstruction areas in which the driving of the main body is complicated from an existing map, and discovering and setting a new cleaning mode based on the found cleaning obstruction areas, and an operation method thereof.

Moreover, yet still another aspect of the present disclosure is to provide a robot cleaner capable of cleaning the found cleaning obstruction areas and the remaining cleaning area in different cleaning modes, and cleaning each of the detected cleaning obstruction areas in different cleaning modes suitable for the environment, and an operation method thereof.

A robot cleaner according to an embodiment of the present disclosure may include a driving unit that moves a main body; a memory that stores driving state information of the driving unit recorded while performing a cleaning operation based on a first map; and a controller that finds a plurality of cleaning areas corresponding to the first map by dividing them into a first area and a second area based on the stored driving state information, wherein the controller generates a second map by removing either one of the first area and the second area from the first map, and performs a cleaning operation in a varied cleaning mode based on the generated second map.

Furthermore, in an embodiment, the controller may set a virtual boundary in an area removed from the first map using the second map, and control the driving unit to perform a cleaning operation by avoiding the set virtual boundary.

Furthermore, in an embodiment, the controller may control the driving unit to perform a cleaning operation in a first cleaning mode for a cleaning area included in the second map, and perform a cleaning operation in a second cleaning mode different from the first cleaning mode for a cleaning area of the first map that is not included in the second map.

Furthermore, in an embodiment, the second map may include cleaning areas in which cleaning obstruction areas have been removed from the first map based on the stored driving state information, and the first cleaning mode may be a quick cleaning mode, and the second cleaning mode may be determined differently according to driving state information recorded in each of the cleaning obstruction areas.

Furthermore, in an embodiment, the driving state information recorded in each of the cleaning obstruction areas may include at least one of a driving path, a driving speed of the main body recorded in each of the cleaning obstruction areas, a number of wheel rotations of the main body, a number of changes in the driving direction of the main body, and a time taken to exit the relevant cleaning area.

Furthermore, in an embodiment, the controller may set at least part of the cleaning area of the first map that is not included in the second map as a cleaning attention area and add it to the second map based on the stored driving state information.

Furthermore, in an embodiment, the controller may increase the sensitivity level of at least one sensor provided in the main body than before while performing a cleaning operation in the cleaning attention area using the second map.

Furthermore, in an embodiment, the controller may recover or decrease the sensitivity level of the sensor in response to sensing that the main body is out of the cleaning attention area.

Furthermore, in an embodiment, the controller may output a control command for increasing a rotation speed of a suction motor provided in the main body than before while performing a cleaning operation for the cleaning attention area using the second map.

Furthermore, in an embodiment, the controller may decrease a driving speed of the main body by the driving unit than before while performing a cleaning operation in the cleaning attention area using the second map.

Furthermore, in an embodiment, the generated second map and data related to the second map may be stored in the memory, and the controller may call the stored second map and the data related to the second map from the memory in response to receiving a driving signal for the cleaning operation.

Furthermore, a robot cleaner according to another embodiment of the present disclosure may include a driving unit that moves a main body; and a controller that collects driving state information by the driving unit while cleaning is performed based on a first map, wherein the controller finds cleaning obstruction areas in which the driving of the driving unit is complicated from the first map, and generates a second map corresponding to the first map based on the found cleaning obstruction areas.

Furthermore, in an embodiment, the driving state information may be collected in a cell unit for each of a plurality of cells constituting the first map.

Furthermore, in an embodiment, the driving state information may include information on a motion of the driving unit corresponding to a situation sensed through at least one sensor provided in the main body.

Furthermore, in an embodiment, the sensed situation may include at least one of sensing of an obstacle existing in a driving path, sensing of a ground state of the driving path, sensing of a wheel falling off of the main body, sensing of a collision of the main body, sensing of a wheel slip of the main body, sensing of wall following, sensing of a virtual wall, sensing of a cliff, and sensing of a learned trap area.

Furthermore, in an embodiment, a motion of the driving unit corresponding to the sensed situation may include a motion of driving the main body in a rotating manner, a backward manner or a curved manner or rotating a wheel provided in the main body in order to exit from the sensed situation.

Furthermore, in an embodiment, the controller may detect at least one cell in which the main body drives in a non-straight manner in the first map based on the driving state information, and find the detected cell and surrounding cells thereof as the cleaning obstruction area.

Furthermore, in an embodiment, the second map may include the remaining areas from which the cleaning obstruction area has been removed from the first map, or may include only the cleaning obstruction area in the first map.

Furthermore, in an embodiment, the controller may control the driving unit to allow the main body to perform cleaning based on the second map.

In addition, a method of operating a robot cleaner according to an embodiment of the present disclosure may include collecting driving state information of a main body recorded while cleaning is performed based on a first map; finding a cleaning obstruction area in which driving complicated in the first map based on the collected driving state information; and generating a second map corresponding to the first map based on the found obstruction area.

Furthermore, in an embodiment, the method further includes performing a cleaning operation of the main body based on the generated second map.

In addition, a method of operating a robot cleaner according to an embodiment of the present disclosure may include storing driving state information of a main body recorded while performing a cleaning operation based on a first map; finding a plurality of cleaning areas corresponding to the first map by dividing them into a first area and a second area based on the stored driving state; generating a second map by removing either one of the first area and the second area from the first map; and performing a cleaning operation in a varied cleaning mode based on the generated second map.

Furthermore, in an embodiment, said generating a second map may include removing a cleaning obstruction area from the first map based on the stored driving state information; and setting at least part of the cleaning area of the first map that is not included in the second map as a cleaning attention area and adding it to the second map based on the stored driving state information.

Furthermore, in an embodiment, said performing a cleaning operation in a varied cleaning mode may include setting cleaning areas other than the cleaning attention area in the second map to a first cleaning mode, and setting the cleaning attention area to a second cleaning mode different from the first cleaning mode; and excluding an area of the first map that is not included in the second map from the cleaning area.

Furthermore, in an embodiment, the first cleaning mode may be a quick cleaning mode, and the second cleaning mode may be a cleaning mode in which at least one of a driving speed of the main body, a sensitivity level of a sensor provided in the main body, and a rotation speed of a suction motor provided in the main body is changed based on driving state information recorded in each cleaning obstruction area.

As described above, according to a robot cleaner and an operation method thereof according to an embodiment of the present disclosure, it may be possible to generate a map that is robust to various environmental variables and highly usable without relying on a sensor. In addition, since it may be possible to find a cleaning obstruction area from an existing map with only the driving status information of the robot cleaner without having a sensor, and a new cleaning mode may be developed and set based thereon, thereby allowing both cleaning efficiency and cleaning time to be satisfied.

For example, it may be possible to quickly clean the remaining areas except for the cleaning obstruction area that it takes a long time to clean and causes map lag. Moreover, it may be possible to reduce the driving speed during the cleaning of the found cleaning obstruction area, increase the sensitivity level of the sensor, and increase the suction power, thereby improving the performing of cleaning. In other words, it may be possible to shorten the cleaning time and improve the cleaning efficiency at the same time.

DETAILED DESCRIPTION OF THE EMBODIMENTS

Hereinafter, a robot cleaner associated with the present disclosure will be described in detail with reference to the accompanying drawings.

Hereinafter, description will be given in detail of embodiments disclosed herein. Technical terms used in this specification are merely used for explaining specific embodiments, and should not be construed to limit the scope of the technology disclosed herein.

Figure 1:
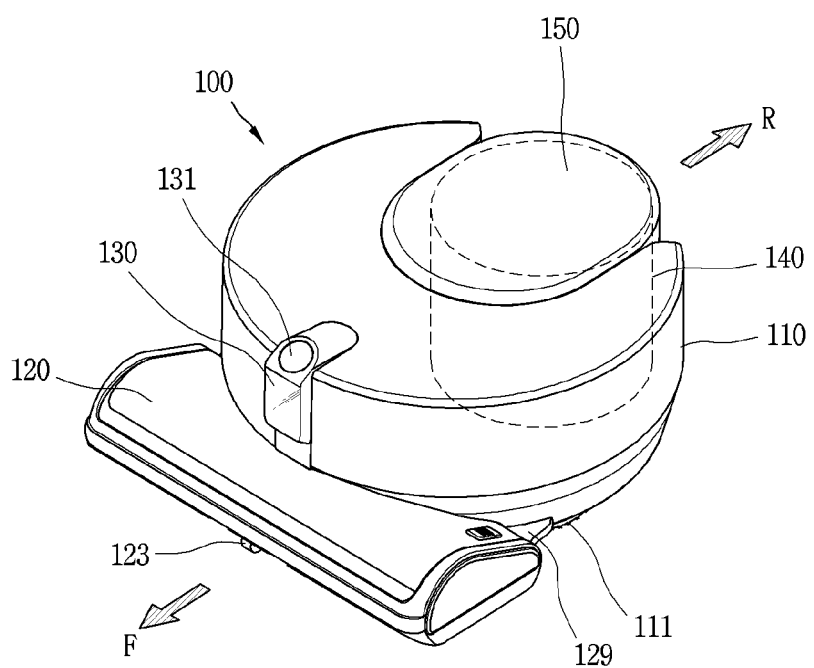
FIG. 1 is a perspective view showing an example of a robot cleaner according to the present disclosure.
Figure 2:
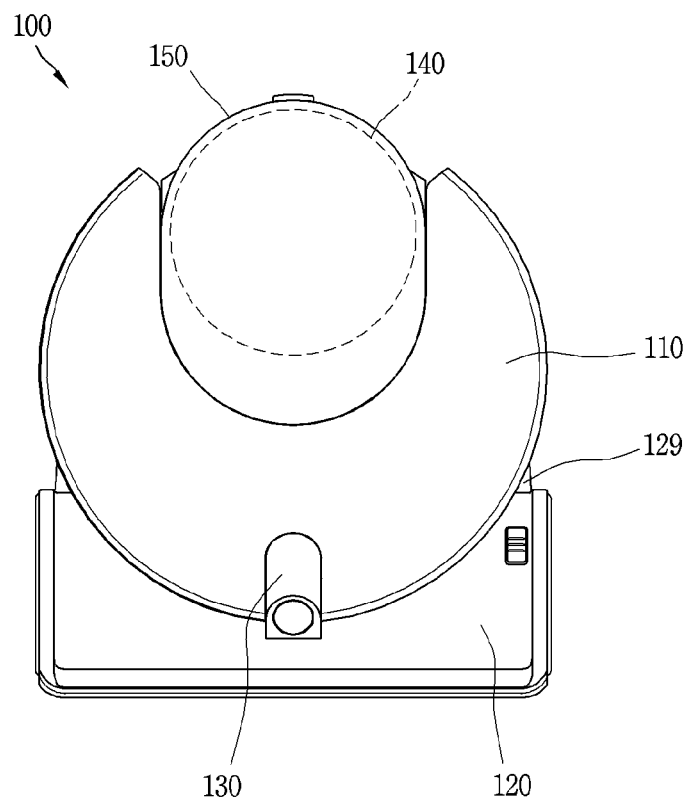
FIG. 2 is a plan view of the robot cleaner illustrated in FIG. 1.
Figure 3:
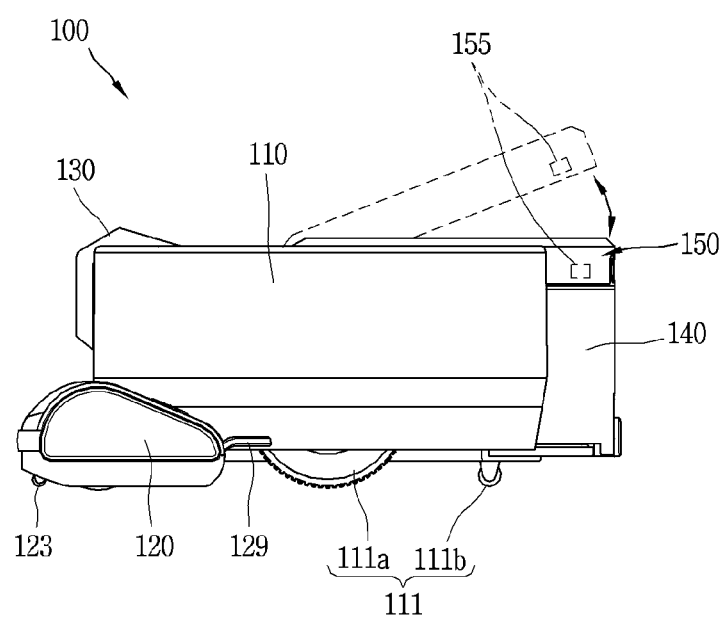
FIG. 3 is a side view of the robot cleaner illustrated in FIG. 1.

FIG. 1 is a perspective view illustrating an example of a robot cleaner 100 according to the present disclosure, FIG. 2 is a plan view of the robot cleaner 100 illustrated in FIG. 1, and FIG. 3 is a side view of the robot cleaner 100 illustrated in FIG.

In this specification, a mobile robot, a robot cleaner, and a cleaner that performs autonomous driving may be used in the same sense. In this specification, a plurality of autonomous cleaners may include at least part of configurations illustrated in FIGS. 1 to 3.

Referring to FIGS. 1 through 3, the robot cleaner 100 performs a function of cleaning a floor while driving on a predetermined area by itself. Cleaning of a floor mentioned here includes sucking dust (including foreign matter) on the floor or mopping the floor.

The robot cleaner 100 may include a cleaner main body 110, a cleaning unit 120, a sensing unit 130, and a dust container 140.

The cleaner main body 110 is provided with various components in addition to a controller (not illustrated) for controlling the robot cleaner 100. In addition, the cleaner main body 110 is provided with a wheel unit 111 for the driving of the robot cleaner 100. The robot cleaner 100 may move forward, backward, leftward and rightward by the wheel unit 111.

Referring to FIG. 3, the wheel unit 111 includes main wheels 111a and a sub wheel 111b.

The main wheels 111a are provided on both sides of the cleaner main body 110 and configured to be rotatable in one direction or another direction according to a control signal of the controller. Each of the main wheels 111a may be configured to be drivable independently from each other. For example, each main wheel 111a may be driven by a different motor. Alternatively, each main wheel 111a may be driven by a plurality of different axes provided in one motor.

The sub wheel 111b is configured to support the cleaner body 110 along with the main wheel 111a and assist the driving of the robot cleaner 100 by the main wheel 111a. The sub wheel 111b may also be provided on a cleaning unit 120 to be described later.

The controller is configured to control the driving of the wheel unit 111 in such a manner that the robot cleaner 100 autonomously drives on the floor.

Meanwhile, a battery (not shown) for supplying power to the robot cleaner 100 is mounted on the cleaner body 110. The battery may be configured to be rechargeable, and configured to be detachable from a bottom portion of the cleaner body 110.

In FIG. 1, a cleaning unit 120 may be disposed in a protruding form from one side of the cleaner main body 110, so as to suck air containing dust or mop an area. The one side may be a side where the cleaner main body 110 drives in a forward direction F, that is, a front side of the cleaner main body 110.

In this drawing, the cleaning unit 120 is shown having a shape protruding from one side of the cleaner main body 110 to front and both left and right sides. Specifically, a front end portion of the cleaning unit 120 is disposed at a position spaced forward apart from the one side of the cleaner main body 110, and left and right end portions of the cleaning unit 120 are disposed at positions spaced apart from the one side of the cleaner main body 110 in the right and left directions.

As the cleaner main body 110 is formed in a circular shape and both sides of a rear end portion of the cleaning unit 120 protrude from the cleaner main body 110 to both left and right sides, empty spaces, namely, gaps may be formed between the cleaner main body 110 and the cleaning unit 120. The vacant space is a space between both left and right end portions of the cleaner body 110 and both left and right end portions of the cleaning unit 120, and has a shape recessed in an inward direction of the robot cleaner 100.

When an obstacle is caught in the vacant space, the robot cleaner 100 may be blocked by an obstacle not to move. In order to prevent this, a cover member 129 may be disposed to cover at least part of the vacant space.

The cover member 129 may be provided on the cleaner main body 110 or the cleaning unit 120. According to the present embodiment, it is shown that the cover member 129 is formed in a protruding manner on both sides of a rear end portion of the cleaning unit 120, and disposed to cover an outer peripheral surface of the cleaner body 110.

The cover member 129 is disposed to fill at least part of the empty space, that is, the empty space between the cleaner main body 110 and the cleaning unit 120. This may result in realizing a structure capable of preventing an obstacle from being caught in the empty space, or to easily escape an obstacle even if the obstacle is caught in the empty space.

The cover member 129 protruding from the cleaning unit 120 may be supported on the outer circumferential surface of the cleaner main body 110.

The cover member 129 may be supported on a rear portion of the cleaning unit 120 if the cover member 129 protrudes from the cleaner main body 110. According to this structure, when the cleaning unit 120 is impacted due to colliding with an obstacle, a part of the impact is transferred to the cleaner main body 110 so as to be dispersed.

The cleaning unit 120 may be detachably coupled to the cleaner main body 110. When the cleaning unit 120 is detached from the cleaner main body 110, a mop module (not shown) may be detachably coupled to the cleaner main body 110 in place of the detached cleaning unit 120.

Accordingly, the user can mount the cleaning unit 120 on the cleaner main body 110 when the user wishes to remove dust on the floor, and may mount the mop module on the cleaner main body 110 when the user wants to mop the floor.

When the cleaning unit 120 is mounted on the cleaner main body 110, the mounting may be guided by the cover member 129 described above. In other words, as the cover member 129 is disposed to cover an outer circumferential surface of the cleaner main body 110 to determine a relative position of the cleaning unit 120 with respect to the cleaner main body 110.

The cleaning unit 120 may be provided with a castor 123. The castor 123 is configured to assist the driving of the robot cleaner 100, and also support the robot cleaner 100.

The cleaner main body 110 is provided with the sensing unit 130. As illustrated, the sensing unit 130 may be disposed on one side of the cleaner main body 110 where the cleaning unit 120 is located, that is, on a front side of the cleaner main body 110.

The sensing unit 130 may be disposed to overlap the cleaning unit 120 in an up and down direction of the cleaner main body 110. The sensing unit 130 is disposed at an upper portion of the cleaning unit 120 to sense an obstacle or geographic feature in front of the robot cleaner 100 so that the cleaning unit 120 positioned at the forefront of the robot cleaner 100 does not collide with the obstacle.

The sensing unit 130 may be configured to additionally perform another sensing function other than the sensing function.

By way of example, the sensing unit 130 may include a camera 131 for acquiring surrounding images. The camera 131 may include a lens and an image sensor. The camera 131 may convert a surrounding image of the cleaner main body 110 into an electrical signal that can be processed by the controller. For example, the camera 131 may transmit an electrical signal corresponding to an upward image to the controller. The electrical signal corresponding to the upward image may be used by the controller to detect the position of the cleaner main body 110.

In addition, the sensing unit 130 may detect obstacles such as walls, furniture, and cliffs on a driving surface or a driving path of the robot cleaner 100. Also, the sensing unit 130 may sense presence of a docking device that performs battery charging. Also, the sensing unit 130 may detect ceiling information so as to map a driving area or a cleaning area of the robot cleaner 100.

The cleaner main body 110 is provided with a dust container 140 detachably coupled thereto for separating and collecting dust from sucked air.

The dust container 140 is provided with a dust container cover 150 which covers the dust container 140. In an embodiment, the dust container cover 150 may be coupled to the cleaner main body 110 by a hinge to be rotatable. The dust container cover 150 may be fixed to the dust container 140 or the cleaner main body 110 to keep covering an upper surface of the dust container 140. The dust container 140 may be prevented from being separated from the cleaner main body 110 by the dust container cover 150 when the dust container cover 150 is disposed to cover the upper surface of the dust container 140.

A part of the dust container 140 may be accommodated in a dust container accommodating portion and another part of the dust container 140 protrudes toward the rear of the cleaner main body 110 (i.e., a reverse direction R opposite to a forward direction F).

The dust container 140 is provided with an inlet through which air containing dust is introduced and an outlet through which air separated from dust is discharged. The inlet and the outlet communicate with each other through an opening 155 formed through an inner wall of the cleaner main body 110 when the dust container 140 is mounted on the cleaner main body 110. Thus, an intake passage and an exhaust passage inside the cleaner main body 110 may be formed.

According to such connection, air containing dust introduced through the cleaning unit 120 flows into the dust container 140 through the intake passage inside the cleaner main body 110 and the air is separated from the dust while passing through a filter and cyclone of the dust container 140. Dust is collected in the dust box 140, and air is discharged from the dust box 140 and then discharged to the outside through the discharge port 112 in the cleaner body 110 and finally through the discharge port 112.

An embodiment related to the components of the robot cleaner 100 will be described below with reference to FIG. 4.

The robot cleaner 100 or the mobile robot according to an embodiment of the present disclosure may include a communication unit 1100, an input unit 1200, a driving unit 1300, a sensing unit 1400, an output unit 1500, a power supply unit 1600, a memory 1700, a controller 1800, and a cleaning unit 1900, or a combination thereof.

Figure 4:
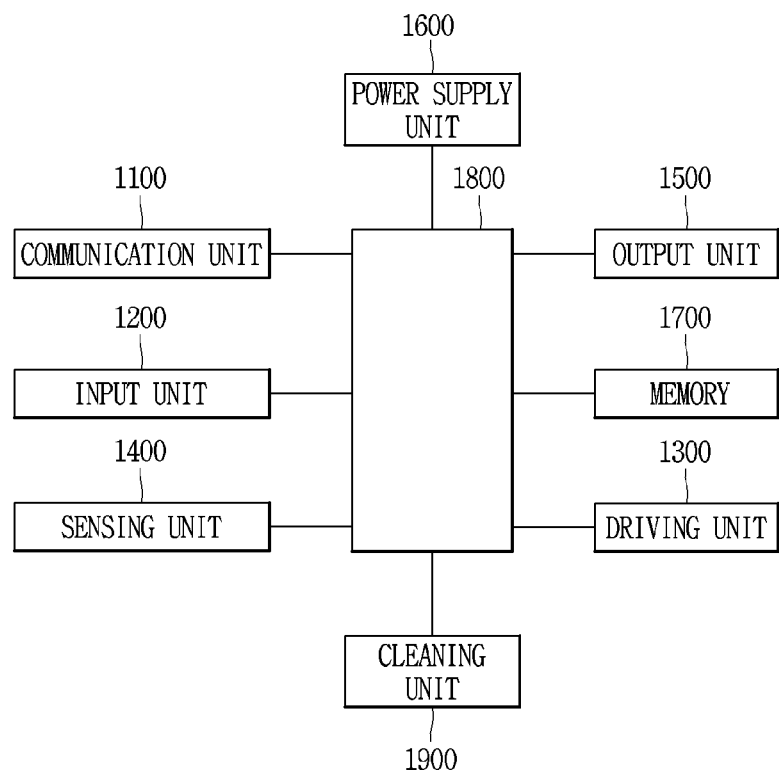
FIG. 4 is a block diagram showing exemplary components of a robot cleaner according to an embodiment of the present disclosure.

Here, it is needless to say that the components shown in FIG. 4 are not essential, and thus a robot cleaner having more or fewer components than shown in FIG. 4 may be implemented. Also, as described above, each of a plurality of robot cleaners described in the present disclosure may equally include only some of components to be described below. In other words, a plurality of robot cleaners may include different components.

Hereinafter, each component will be described.

First, the power supply unit 1600 includes a battery that can be charged by an external commercial power supply, and supplies power to the mobile robot. The power supply unit 1600 supplies driving power to each of the components included in the mobile robot to supply operating power required for the mobile robot to drive or perform a specific function.

Here, the controller 1800 may sense the remaining power of the battery, and control the battery 1800 to move power to a charging base connected to the external commercial power source when the remaining power is insufficient, and thus a charge current may be supplied from the charging base to charge the battery. The battery may be connected to a battery sensing unit, and a battery remaining amount and a charging state may be delivered to the controller 1800. The output unit 1500 may display the remaining battery level under the control of the controller.

The battery may be located in a lower portion of the center of the robot cleaner or may be located at either one of the left and right sides. In the latter case, the mobile robot may further include a balance weight for eliminating a weight bias of the battery.

The controller 1800 performs a role of processing information based on an artificial intelligence technology and may include at least one module for performing at least one of learning of information, inference of information, perception of information, and processing of a natural language.

The controller 1800 may use a machine learning technology to perform at least one of learning, inference and processing of a large amount of information (big data), such as information stored in the cleaner, environment information around the cleaner, information stored in a communicable external storage, and the like. Furthermore, the controller 1800 may predict (or infer) at least one executable operation of the cleaner based on information learned using the machine learning technology, and control the cleaner to execute the most feasible operation among the at least one predicted operation.

The machine learning technology is a technology that collects and learns a large amount of information based on at least one algorithm, and determines and predicts information based on the learned information. The learning of information is an operation of grasping characteristics of information, rules and judgment criteria, quantifying a relation between information and information, and predicting new data using the quantified patterns.

Algorithms used by the machine learning technology may be algorithms based on statistics, for example, a decision tree that uses a tree structure type as a prediction model, an artificial neural network that mimics neural network structures and functions of living creatures, genetic programming based on biological evolutionary algorithms, clustering of distributing observed examples to a subset of clusters, a Monte Carlo method of computing function values as probability using randomly-extracted random numbers, and the like.

As one field of the machine learning technology, deep learning is a technology of performing at least one of learning, determining, and processing information using a deep neural network (DNN) algorithm. The deep neural network (DNN) may have a structure of linking layers and transferring data between the layers. This deep learning technology may be employed to learn a vast amount of information through the deep neural network (DNN) using a graphic processing unit (GPU) optimized for parallel computing.

The controller 1800 may use training data stored in an external server or a memory, and may include a learning engine for detecting a characteristic for recognizing a predetermined object. Here, characteristics for recognizing an object may include the size, shape, and shade of the object.

Specifically, when the controller 1800 inputs a part of images acquired through the camera provided on the cleaner into the learning engine, the learning engine may recognize at least one object or organism included in the input images.

When the learning engine is applied to driving of the cleaner, the controller 1800 can recognize whether or not an obstacle such as a chair leg, a fan, and a specific shape of balcony gap, which obstruct the running of the cleaner, exists around the cleaner. This may result in enhancing efficiency and reliability of the driving of the cleaner.

On the other hand, the learning engine may be mounted on the controller 1800 or on an external server. When the learning engine is mounted on an external server, the controller 1800 may control the communication unit 1100 to transmit at least one image to be analyzed, to the external server.

The external server may input the image transmitted from the cleaner into the learning engine and thus recognize at least one object or organism included in the image. In addition, the external server may transmit information related to the recognition result back to the cleaner. In this case, the information related to the recognition result may include information related to the number of objects included in the image to be analyzed and a name of each object.

On the other hand, the driving unit 1300 may include a motor, and operate the motor to bidirectionally rotate left and right main wheels, so that the main body can rotate or move. At this time, the left and right main wheels may be independently moved. The driving unit 1300 may advance the main body of the mobile robot forward, backward, left, right, curvedly, or in place.

Meanwhile, the input unit 1200 receives various control commands for the robot cleaner from the user. The input unit 1200 may include one or more buttons, for example, the input unit 1200 may include an OK button, a set button, and the like. The OK button is a button for receiving a command for confirming sensing information, obstacle information, position information, and map information from the user, and the set button is a button for receiving a command for setting the information from the user.

In addition, the input unit 1200 may include an input reset button for canceling a previous user input and receiving a user input again, a delete button for deleting a preset user input, a button for setting or changing an operation mode, a button for receiving a command to be restored to the charging base, and the like.

Furthermore, the input unit 1200, such as a hard key, a soft key, a touch pad, or the like, may be installed on a upper portion of the mobile robot. In addition, the input unit 1200 may have a form of a touch screen along with the output unit 1500.

On the other hand, the output unit 1500 may be installed on an upper portion of the mobile robot. Of course, the installation location and installation type may vary. For example, the output unit 1500 may display a battery state, a driving mode, and the like on the screen.

In addition, the output unit 1500 may output state information inside the mobile robot detected by the sensing unit 1400, for example, a current state of each configuration included in the mobile robot. Moreover, the output unit 1500 may display external state information, obstacle information, position information, map information, and the like detected by the sensing unit 1400 on the screen. The output unit 1500 may be formed with any one of a light emitting diode (LED), a liquid crystal display (LCD), a plasma display panel, and an organic light emitting diode (OLED).

The output unit 1500 may further include a sound output device for audibly outputting an operation process or an operation result of the mobile robot performed by the controller 1800. For example, the output unit 1500 may output a warning sound to the outside in accordance with a warning signal generated by the controller 1800.

In this case, the audio output module (not shown) may be means, such as a beeper, a speaker or the like for outputting sounds, and the output unit 1500 may output sounds to the outside through the audio output module using audio data or message data having a predetermined pattern stored in the memory 1700.

Accordingly, the mobile robot according to an embodiment of the present disclosure may output environment information on a driving area on the screen or output it as sound. According to another embodiment, the mobile robot may transmit map information or environment information to a terminal device through the communication unit 1100 to output a screen or sound to be output through the output unit 1500.

The memory 1700 stores a control program for controlling or driving the robot cleaner and the resultant data. The memory 1700 may store audio information, image information, obstacle information, position information, map information, and the like. Furthermore, the memory 1700 may store information related to a driving pattern.

The memory 1700 mainly uses a nonvolatile memory. Here, the non-volatile memory (NVM, NVRAM) is a storage device capable of continuously storing information even when power is not supplied thereto, and for an example, the non-volatile memory may be a ROM, a flash memory, a magnetic computer storage device (e.g., a hard disk, a diskette drive, a magnetic tape), an optical disk drive, a magnetic RAM, a PRAM, and the like.

Meanwhile, the sensing unit 1400 may include at least one of an external signal detection sensor, a front detection sensor, a cliff detection sensor, a two-dimensional camera sensor, and a three-dimensional camera sensor.

The external signal detection sensor may sense an external signal of the mobile robot. The external signal detection sensor may be, for example, an infrared ray sensor, an ultrasonic sensor, a radio frequency (RF) sensor, or the like.

The mobile robot may receive a guide signal generated by the charging base using the external signal detection sensor to check the position and direction of the charging base. At this time, the charging base may transmit a guide signal indicating the direction and the distance to allow the mobile robot to return. In other words, the mobile robot may receive a signal transmitted from the charging base to determine a current position, set a moving direction, and return to the charging base.

On the other hand, the front detection sensor may be installed at predetermined intervals at a front side of the mobile robot, specifically along a lateral outer circumferential surface of the mobile robot. The front sensor is located on at least one side surface of the mobile robot to detect an obstacle in front of the mobile robot. The front sensor may detect an object, especially an obstacle, existing in a moving direction of the mobile robot and transmit detection information to the controller 1800. In other words, the front sensor may detect protrusions on the moving path of the mobile robot, household appliances, furniture, walls, wall corners, and the like, and transmit the information to the controller 1800.

For example, the frontal sensor may be an infrared ray (IR) sensor, an ultrasonic sensor, an RF sensor, a geomagnetic sensor, or the like, and the mobile robot may use one type of sensor as the front sensor or two or more types of sensors if necessary.

For an example, the ultrasonic sensors may be mainly used to sense a distant obstacle in general. The ultrasonic sensor may include a transmitter and a receiver, and the controller 1800 may determine whether or not there exists an obstacle based on whether or not ultrasonic waves radiated through the transmitter is reflected by the obstacle or the like and received at the receiver, and calculate a distance to the obstacle using the ultrasonic emission time and ultrasonic reception time.

Furthermore, the controller 1800 may compare ultrasonic waves emitted from the transmitter and ultrasonic waves received at the receiver to detect information related to a size of the obstacle. For example, the controller 1800 may determine that the larger the obstacle is, the more ultrasonic waves are received at the receiver.

In one embodiment, a plurality of (for example, five) ultrasonic sensors may be provided along a lateral outer circumferential surface at a front side of the mobile robot. At this time, the ultrasonic sensors may preferably be installed on the front surface of the mobile robot in a manner that the transmitter and the receiver are alternately arranged.

In other words, the transmitters may be spaced apart from the front center of the main body to the left and right sides, and one or two (or more) transmitters may be disposed between the receivers to form a receiving area of ultrasonic signals reflected from an obstacle or the like. With this arrangement, the receiving area may be expanded while reducing the number of sensors. A transmission angle of ultrasonic waves may maintain a range of angles that do not affect different signals to prevent a crosstalk phenomenon. Furthermore, the receiving sensitivities of the receivers may be set to be different from each other.

In addition, the ultrasonic sensor may be installed upward by a predetermined angle so that the ultrasonic waves emitted from the ultrasonic sensor are output upward. In this instance, the ultrasonic sensor may further include a predetermined blocking member to prevent the ultrasonic waves from being radiated downward.

On the other hand, as described above, the front sensor may be implemented by using two or more types of sensors together, and thus the front sensor may use any one of an IR sensor, an ultrasonic sensor, an RF sensor and the like.

For example, the front detection sensor may include an infrared sensor as a different type of sensor other than the ultrasonic sensor.

The infrared sensor may be installed on an outer circumferential surface of the mobile robot together with the ultrasonic sensor. The infrared sensor may also sense an obstacle existing at the front or the side to transmit obstacle information to the controller 1800. In other words, the infrared sensor may sense a protrusion on the moving path of the mobile robot, a household appliance, a furniture, a wall, a wall corner, and the like, and transmit the information to the controller 1800. Therefore, the mobile robot may move within a specific area without collision with the obstacle.

On the other hand, a cliff detection sensor (or cliff sensor) may sense an obstacle on the floor supporting the main body of the mobile robot mainly using various types of optical sensors.

In other words, the cliff detection sensor may be installed on a rear surface of the bottom mobile robot, but may of course be installed in a different position depending on the type of the mobile robot. The cliff detection sensor is a sensor located on a back surface of the mobile robot to sense an obstacle on the floor, and the cliff detection sensor may be an infrared sensor, an ultrasonic sensor, an RF sensor, a PSD (Position Sensitive Detector) sensor, or the like, which is provided with a transmitter and a receiver such as the obstacle detection sensor.

For an example, any one of the cliff detection sensors may be installed in front of the mobile robot, and the other two cliff detection sensors may be installed relatively behind.

For example, the cliff detection sensor may be a PSD sensor, but may also be configured with a plurality of different kinds of sensors.

The PSD sensor detects a short and long distance position of incident light with one p-n junction using a semiconductor surface resistance. The PSD sensor includes a one-dimensional PSD sensor that detects light only in one axial direction, and a two-dimensional PSD sensor that detects a light position on a plane. Both of the PSD sensors may have a pin photodiode structure. The PSD sensor is a type of infrared sensor that uses infrared rays to transmit infrared rays and then measure an angle of infrared rays reflected from and returned back to an obstacle so as to measure a distance. In other words, the PSD sensor calculates a distance from the obstacle by using the triangulation method.

The PSD sensor includes a light emitter that emits infrared rays to an obstacle and a light receiver that receives infrared rays that are reflected and returned from the obstacle, and is configured typically as a module type. When an obstacle is sensed using the PSD sensor, a stable measurement value may be obtained irrespective of the reflectance and the color difference of the obstacle.

The cleaning unit 1900 cleans a designated cleaning area according to a control command transmitted from the controller 1800. The cleaning unit 1900 scatters dust in the vicinity through a brush (not shown) that scatters dust in a designated cleaning area, and then drives the suction fan and the suction motor to suck the scattered dust. In addition, the cleaning unit 1900 may perform mopping in a designated cleaning area according to the replacement of the configuration.

Furthermore, the controller 1800 may measure an infrared ray angle between a light signal of infrared ray emitted by the cliff detection sensor toward the ground and a reflection signal reflected and received from an obstacle, so as to detect a cliff and analyze a depth of the cliff.

Meanwhile, the controller 1800 may determine whether to pass a cliff or not according to a ground state of the detected cliff by using the cliff detection sensor, and decide whether to pass the cliff or not according to the determination result. For example, the controller 1800 determines presence or non-presence of a cliff and a depth of the cliff through the cliff sensor, and then allows the mobile robot to pass through the cliff only when a reflection signal is detected through the cliff sensor.

As another example, the controller 1800 may also determine lifting of the mobile robot using the cliff sensor.

On the other hand, the two-dimensional camera sensor is provided on one side of the mobile robot to acquire image information related to the surroundings of the main body during movement.

An optical flow sensor converts a downward image input from an image sensor provided in the sensor to generate image data in a predetermined format. The generated image data may be stored in the memory 1700.

Furthermore, one or more light sources may be installed adjacent to the optical flow sensor. The one or more light sources irradiate light to a predetermined area of the bottom surface captured by the image sensor. In other words, when the mobile robot moves in a specific area along the bottom surface, a predetermined distance is maintained between the image sensor and the bottom surface when the bottom surface is flat. On the other hand, when the mobile robot moves on a bottom surface having a nonuniform surface, the robot moves away from the bottom surface by more than a predetermined distance due to the irregularities of the bottom surface and obstacles. At this time, the one or more light sources may be controlled by the controller 1800 to adjust an amount of light to be irradiated. The light source may be a light emitting device capable of controlling the amount of light, for example, a light emitting diode (LED) or the like.

Using the optical flow sensor, the controller 1800 may detect a position of the mobile robot irrespective of the slip of the mobile robot. The controller 1800 may compare and analyze the image data captured by the optical flow sensor over time to calculate the moving distance and the moving direction, and calculate the position of the mobile robot on the basis of the moving distance and the moving direction. Using image information on a bottom side of the mobile robot using the optical flow sensor, the controller 1800 may perform slip-resistant correction on the position of the mobile robot calculated by another device.

The three-dimensional camera sensor may be attached to one side or a part of the main body of the mobile robot to generate three-dimensional coordinate information related to the surroundings of the main body.

In other words, the three-dimensional camera sensor may be a 3D depth camera that calculates a near and far distance of the mobile robot and an object to be captured.

Specifically, the three-dimensional camera sensor may capture a two-dimensional image related to the surroundings of the main body, and generate a plurality of three-dimensional coordinate information corresponding to the captured two-dimensional image.

In an embodiment, the three-dimensional camera sensor may include two or more cameras that acquire a conventional two-dimensional image, and may be formed in a stereo vision manner to combine two or more images obtained from the two or more cameras so as to generate three-dimensional coordinate information.

Specifically, the three-dimensional camera sensor according to the embodiment may include a first pattern irradiation unit for irradiating light with a first pattern in a downward direction toward the front of the main body, and a second pattern irradiation unit for irradiating the light with a second pattern in an upward direction toward the front of the main body, and an image acquisition unit for acquiring an image in front of the main body. As a result, the image acquisition unit may acquire an image of an area where light of the first pattern and light of the second pattern are incident.

In another embodiment, the three-dimensional camera sensor may include an infrared ray pattern emission unit for irradiating an infrared ray pattern together with a single camera, and capture the shape of the infrared ray pattern irradiated from the infrared ray pattern emission unit onto the object to be captured, thereby measuring a distance between the sensor and the object to be captured. Such a three-dimensional camera sensor may be an IR (infrared) type three-dimensional camera sensor.

In still another embodiment, the three-dimensional camera sensor may include a light emitting unit that emits light together with a single camera, receive a part of laser emitted from the light emitting unit reflected from the object to be captured, and analyze the received laser, thereby measuring a distance between the three-dimensional camera sensor and the object to be captured. The three-dimensional camera sensor may be a time-of-flight (TOF) type three-dimensional camera sensor.

Specifically, the laser of the above-described three-dimensional camera sensor is configured to irradiate a laser beam in the form of extending in at least one direction. In one example, the three-dimensional camera sensor may include first and second lasers, wherein the first laser irradiates a linear shaped laser intersecting each other, and the second laser irradiates a single linear shaped laser. According to this, the lowermost laser is used to sense obstacles in the bottom portion, the uppermost laser is used to sense obstacles in the upper portion, and the intermediate laser between the lowermost laser and the uppermost laser is used to sense obstacles in the middle portion.

On the other hand, the communication unit 1100 is connected to a terminal device and/or another device (also referred to as "home appliance" herein) through one of wired, wireless and satellite communication methods, so as to transmit and receive signals and data.

The communication unit 1100 may transmit and receive data with another located in a specific area. Here, the another device may be any device capable of connecting to a network to transmit and receive data, and for example, the device may be an air conditioner, a heating device, an air purification device, a lamp, a TV, an automobile, or the like. The another device may also be a device for controlling a door, a window, a water supply valve, a gas valve, or the like. The another device may be a sensor for sensing temperature, humidity, air pressure, gas, or the like.

Further, the communication unit 1100 may communicate with another robot cleaner 100 located in a specific area or within a predetermined range.

On the other hand, the robot cleaner 100 according to the present disclosure may generate a map that is robust to various environmental variables and highly usable without relying on a sensor. Furthermore, while the cleaning operation is performed based on an existing map, a cleaning obstruction area in which driving is complicated may be distinguished and found based on an actual driving state of the robot cleaner 100. Moreover, based on the found cleaning obstruction area, a new map may be generated and/or a new cleaning mode may be set.

Figure 5:
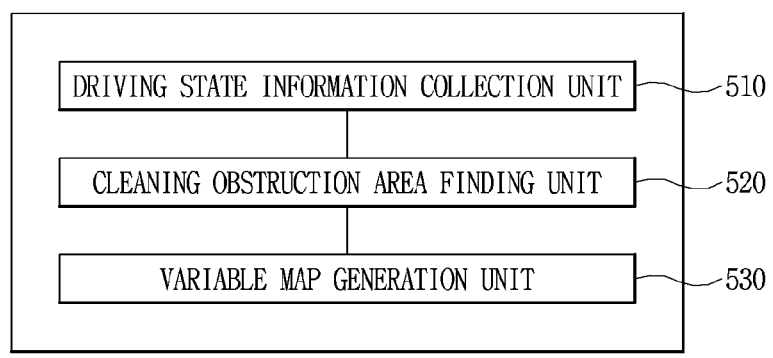
FIG. 5 is a block diagram illustrating a main configuration for generating a map based on driving state information in a robot cleaner according to an embodiment of the present disclosure.

Hereinafter, a main configuration of the robot cleaner 100 for generating a new map based on driving state information will be described with reference to FIG. 5.

In addition to the configuration described with reference to FIGS. 1 to 4, the robot cleaner 100 according to the present disclosure may further include a driving state information collection unit 510, a cleaning obstruction area finding unit 520, and a variable map generation unit 530.

Furthermore, an operation by the driving state information collection unit 510, the cleaning obstruction area finding unit 520, and the variable map generation unit 530 may be performed by the controller 1800 (or hardware process) of FIG. 4.

Specifically, the driving state information collection unit 510 collects driving state information for each area or cells constituting each region while the robot cleaner 100 cleans a designated cleaning area.

Here, the driving state information includes all information on the motion of the driving unit 1300 corresponding to a situation sensed through a sensor provided in the robot cleaner 100 while performing a cleaning operation based on an existing map (hereinafter, referred to as a "first map").

Specifically, the sensed situation may include a case where the robot cleaner 100 senses an obstacle existing in a driving path, senses a ground state of the driving path, or senses a wheel falling off of the robot cleaner body in a cleaning area corresponding to the first map.

Furthermore, the sensed situation may include a case where that the robot cleaner body senses a collision, senses a wheel slip of the body, senses a wall following, senses a set virtual wall, senses a cliff, or senses a learned trap.

In order to sense such a situation, the robot cleaner 100 may include at least one sensor. For example, the robot cleaner 100 may include a 2D/3D camera sensor, a front sensor, a cliff sensor, an external signal detection sensor (infrared, ultrasonic, RF, UWB sensor, etc.), a collision sensor (/bumper), a geomagnetic sensor, a bumper sensor, a floor sensor, and the like.

In addition, in order to detect such a situation, the robot cleaner 100 may communicate with a server (not shown) or may access its own memory 1700.

In this case, the robot cleaner may detect information on a learned trap area or setting information by an input based on training data stored in the server or memory 1700.

On the other hand, the present invention does not rely on a sensor to find a cleaning obstruction area in which driving is complicated. Therefore, there is no limitation on the type and number of sensors of the robot cleaner 100 that must be provided therein in order to sense the above-described situation.

Specifically, even in the same cleaning area, the driving state of the robot cleaner may vary depending on the structure, performance, and/or the number of sensors provided therein. For example, a robot cleaner may be driven in a straight manner, but another robot cleaner may cause wheel slip in the relevant area/cell.

The motion of the driving unit 1300 corresponding to the sensed situation as described above may include a motion of driving the robot cleaner body in a rotating manner, a backward manner or a curved line or rotating a wheel provided in the robot cleaner body in order to exit from the sensed situation.

For example, when a wheel of the driving unit 1300 is rotated several times to exit the relevant area/point in a situation in which wheel slip is found, it may be recognized as a motion of the driving unit 1300 corresponding to the sensed situation.

Furthermore, when temporarily escaping from a predetermined driving path to avoid an obstacle in a situation where the obstacle is sensed in the front, it may be recognized as a motion of the driving unit 1300 corresponding to the sensed situation.

Accordingly, information on the motion of the driving unit includes information on a number of rotations of the wheel, a direction of rotation of the wheel, and a number of changes in the rotation direction of the driving unit 1300.

A case where the robot cleaner body is driven to rotate, move backward, or move in a curved manner, or a wheel provided in the robot cleaner body is rotated in order to be driven according to a predetermined driving path may be excluded from the information on the motion of the driving unit.

For example, a case where the robot cleaner 100 rotates the main body or a wheel provided in the main body in order to change a driving line according to a zigzag cleaning mode may be excluded from information on the motion of the driving unit described above.

The cleaning obstruction area finding unit 520 finds a cleaning obstruction area in which driving is complicated from the first map based on driving status information collected by the driving status information collection unit 510.

Here, the cleaning obstruction area in which driving is complicated refers to an area in which a response motion of the driving unit 1300 has been generated based on a situation sensed based on a sensor provided in the robot cleaner 100 and/or access information.

The response motion, which is an operation of the driving unit 1300 to overcome the sensed situation, may include a motion of performing, for example, rotation, backward movement, change-of-direction, stop, change-of-speed, rotation-in-place, riding, and the like.

Therefore, a case where the robot cleaner 100 drives in a straight manner or a case where the robot cleaner 100 drives on a driving path determined based on the first map may be excluded from the cleaning obstruction area even when the robot cleaner 100 performs rotation, backward movement, change-of-direction, and the like.

In addition, the cleaning obstruction area finding unit 520 may detect at least one cell in which the main body drives in a non-straight manner from the first map based on the driving state information by the driving unit 1300 of the robot cleaner. Moreover, an area including the detected cell and surrounding cells thereof may be found as a cleaning obstruction area.

The variable map generation unit 530 generates a second map corresponding to the first map based on the cleaning obstruction area detected by the cleaning obstruction area finding unit 520.

Specifically, the second map may be generated by removing all of the found cleaning obstruction areas from the first map. Furthermore, the second map may be generated by including only the found cleaning obstruction area as a cleaning area.

In addition, the second map may be generated by maintaining only some of the found cleaning obstruction areas in the first map that satisfy a preset condition and removing the other areas. In this case, the second map is generated to allow the robot cleaner 100 to distinguish and recognize the added cleaning obstruction areas and other cleaning areas.

When the second map is generated in this way, the robot cleaner 100 may now perform a cleaning operation using the second map.

For example, cleaning may be performed by rapidly driving straight ahead only the remaining areas except for the cleaning obstruction areas using the second map. Furthermore, for example, cleaning may be performed while changing the cleaning mode in the cleaning obstruction areas using the second map. Specific embodiments of the cleaning operation using the second map will be described in more detail below.

Figure 6:
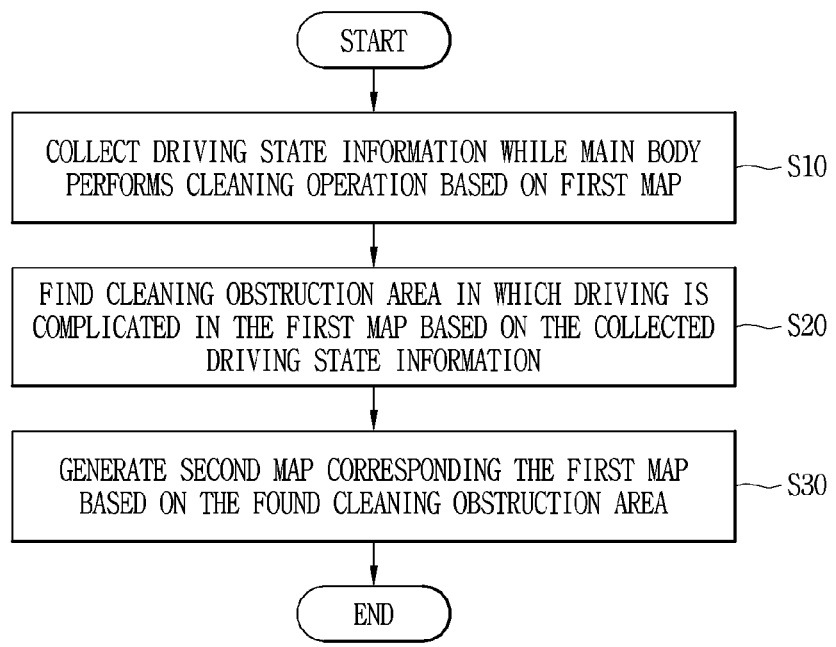
FIG. 6 is a flowchart illustrating a method of generating a map based on driving state information in the robot cleaner according to an embodiment of the present disclosure.

Hereinafter, FIG. 6 is a flowchart for explaining a method of generating a map based on driving state information in the robot cleaner 100 according to the present disclosure.

Referring to FIG. 6, first, while the main body of the robot cleaner 1000 performs a cleaning operation based on the first map, driving state information on the cleaning areas of the first map is collected (510).

Here, the first map may be a map generated by the robot cleaner 100 based on information obtained by initially searching for unknown areas, for example, an obstacle map. In addition, the first map may be a learning map in which the robot cleaner 100 reflects a path plan established for each cleaning area using the map and learned data on the map.

Furthermore, the collection of the driving state information may be collected in a cell unit for each of a plurality of cells constituting the first map. The first map may be a grid map composed of a plurality of cells.

Whenever the robot cleaner 100 passes through one cell constituting the first map, driving state information is recorded by the driving unit 1300 of the robot cleaner 100.

Specifically, it may be recorded whether the robot cleaner 100 has driven in a straight or non-straight manner in the relevant cell. In addition, when the robot cleaner 100 drives in a non-straight manner in the relevant cell, rotates in place, or changes the driving direction, it may be obtained whether the motion corresponds to a predetermined driving path.

In a case where the main body drives and passes through a specific cell in a non-straight manner and the path does not correspond to a predetermined driving path, the controller of the robot cleaner 100 recognizes it as a motion of the driving unit 1300 corresponding to a specific situation, that is, a response motion.

The collection of such driving state information is ended upon completion of cleaning for the cleaning areas of the first map.

Next, the robot cleaner 1000 finds a cleaning obstruction area in which driving is complicated from the first map based on the collected driving state information (S20).

Here, the cleaning obstruction area refers to an area in which a response motion of the driving unit 1300 has been generated based on a situation sensed based on a sensor provided in the robot cleaner 100 and/or information accessed by the robot cleaner.

Alternatively, the cleaning obstruction area refers to an area including cells that do not correspond to a predetermined driving path while the driving unit of the robot cleaner 100 drives in a non-straight manner based on the collected driving state information.

The controller of the robot cleaner 100 may attach an adjacent cell in which a response motion by the driving unit 1300 has been generated and set it as a cleaning obstruction area. Accordingly, there may be one or a plurality of cleaning areas in the first map, and since driving state information is collected in a cell unit, the size or shape may be different from each other.

An important point here is that the cleaning obstruction area is found not based on information sensed through a sensor, but based on information on a driving state of the robot cleaner 100.

Therefore, when the robot cleaner types are different, motions of the driving unit corresponding to the sensed situations may be different from each other, and thus the number, position, size, and shape of the found cleaning obstruction areas may be different.

Next, the robot cleaner 100 may generate a second map corresponding to the first map based on the found cleaning obstruction areas (S30).

Specifically, the second map may be generated by removing all of the found cleaning obstruction areas from the first map. Furthermore, the second map may be generated by including only the found cleaning obstruction area as a cleaning area.

In addition, the second map may be generated by maintaining only some of the found cleaning obstruction areas in the first map that satisfy a preset condition and removing the other areas. In this case, the second map is generated to allow the robot cleaner 100 to distinguish and recognize the added cleaning obstruction areas and other cleaning areas.

The generated second map may be stored together with the first map in a memory of the robot cleaner 100 or in a server capable of communicating therewith. In addition, if necessary, the robot cleaner 100 may call only one of the first map and the second map, or call both the first map and the second map and use them during a cleaning operation.

As described above, in the present disclosure, it may be possible to generate a map that is robust to various environmental variables and highly usable without relying on a sensor of a robot cleaner. In addition, a cleaning obstruction area that takes a long time to clean and is complicated to drive may be found using only the driving state information of the robot cleaner based on the map to reflect it on a new map.

Figure 7A:
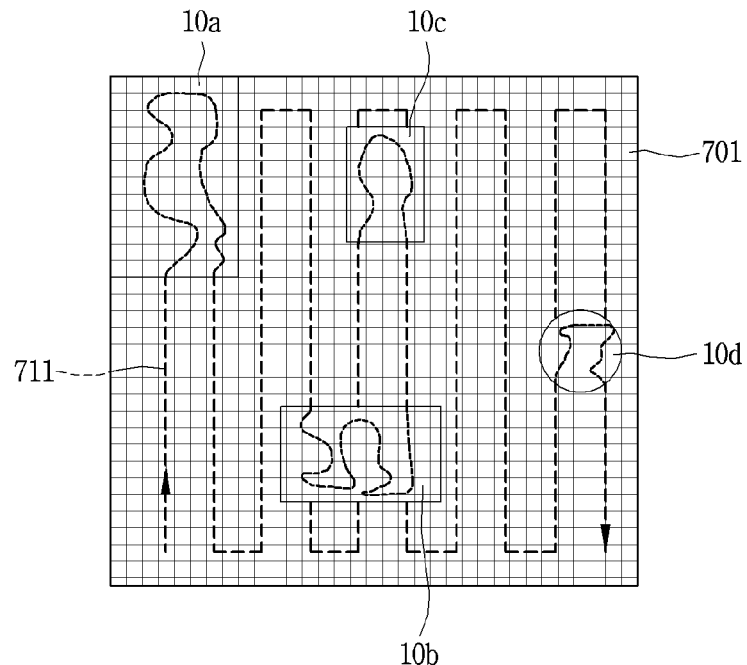
FIGS. 7A, 7B, 8A, and 8B are conceptual views illustrating a process of generating a map based on driving state information and an example of the generated map in the robot cleaner according to an embodiment of the present disclosure.
Figure 7B:
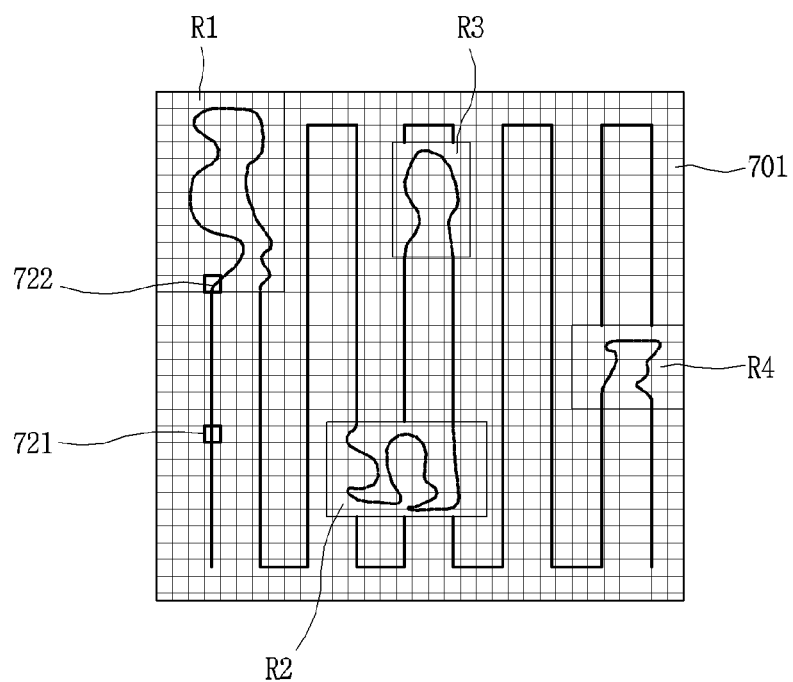
Figure 8A:
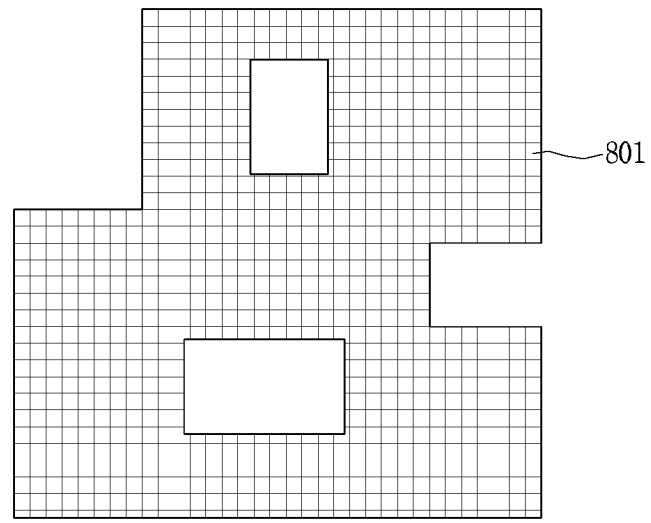
Figure 8B:
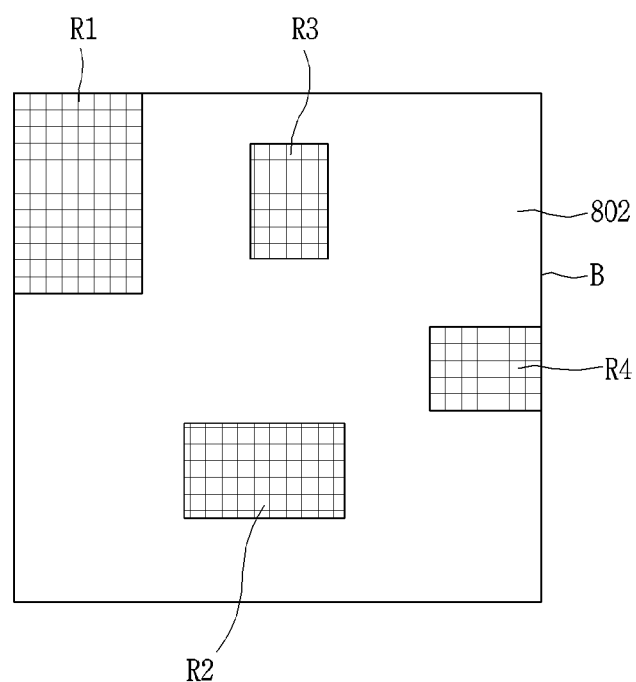

Hereinafter, FIGS. 7A and 7B are exemplary conceptual views for finding cleaning obstruction areas, and FIGS. 8A and 8B illustrate an example of a second map generated based on the found cleaning obstruction areas.

First, a method of finding cleaning obstruction areas from a first map will be described in detail with reference to FIGS. 7A and 7B.

As illustrated in FIG. 7A, the first map 701 may be used for the robot cleaner 100 to drive a cleaning area on a zigzag driving path.

However, the actual driving path 711 of the robot cleaner 100 based on the first map 701 attempts driving different from the zigzag driving path when a specific situation is detected. In other words, the robot cleaner 100 drives in a non-straight manner in a cleaning area, continuously rotates the wheel to exit, or performs a response motion that forms a complicated path.

The determination as to whether the response motion has been performed is made for each of a plurality of cells constituting the first map 701 in a cell unit.

The robot cleaner stores the driving state of the driving unit 1300 each time it passes through each cell until the entire area of the first map 701 is covered.

Here, the driving state includes both a case where a response motion is not performed to drive in a straight manner and a case where a response motion is performed.

Specifically, while a specific situation is not sensed, the robot cleaner drives on a zigzag driving path in the cleaning area of the first map 701. At this time, the robot cleaner passes through a cell 721 in a straight manner, as illustrated in FIG. 7B. This driving state information may be classified into a first group.

Then, when a first situation in which cleaning under a sofa needs to be cleaned (must be driven by avoiding a plurality of sofa legs) is sensed, a first response motion 10a corresponding to the sensed first situation is generated In this case, the robot cleaner passes through a cell 722 in a non-straight manner, as illustrated in FIG. 7B. This driving state information may be classified into a second group.

Further, for example, when a second situation in which the ground state is uneven is sensed, a second response motion 10b corresponding to the sensed second situation is generated.

In addition, when a third situation is sensed by detection of an obstacle, for example, a third response motion 10c corresponding to the sensed third situation may be generated.

Further, for example, when a fourth situation according to a wheel slip of the robot cleaner or a virtual wall or a learned trap is sensed, a fourth response motion 10d corresponding to the sensed fourth situation may be generated.

At this time, driving state information corresponding to cells that have passed through non-straight driving by the second response motion 10b, the third response motion 10c, and the fourth response motion 10d may be classified into the second group.

However, driving information for each of the first response motions 10a to fourth response motions 10d, for example, driving information regarding the number of rotations of the wheel, the direction of rotation of the wheel, and the number of changes in the rotation direction of the driving unit 1300 is also recorded.

Therefore, when the driving of the robot cleaner based on the first map 701 is completed, the controller of the robot cleaner may not only distinguish between an area in which the response motion has been generated and an area that has not been generated, but also distinguish and recognize a plurality of areas in which the first response motion 10a to the fourth response motion 10d have been generated, from each other.

Furthermore, each of the first response motion 10a to the fourth response motion 10d does not denote one driving motion for any one situation.

For example, for the fourth response motion corresponding to the above-described fourth situation, various response motions such as wheel rotation→backward movement→forward movement→wheel rotation may be generated multiple times, and the fourth response motion includes all the motions of the driving unit.

In addition, in the present disclosure, there is no particular limitation on elements for sensing the above-described first to fourth situations. In other words, a sensor provided in the robot cleaner may be used, or a server in connection with the robot cleaner may be used.

For example, the wheel slip may be sensed based on the number of rotations and movement displacement of the wheel of the robot cleaner. The virtual wall may be sensed through a magnetic sensor provided in the robot cleaner. Furthermore, the learned trap may be sensed by accessing information stored in the memory of the robot cleaner or a server in connection therewith.

In addition, even when the first to fourth situations are sensed in the same manner, a difference may be generated in the response motion according to the performance/specification of the robot cleaner. Therefore, finally, the size, shape, and number of the cleaning obstruction areas may vary for each robot cleaner to be used.

Furthermore, even when the performance/specifications of the robot cleaner are the same, some of the first to fourth situations may not be sensed according to the learned data. For example, since a robot cleaner for which trap learning has not been performed is unable to sense the fourth situation, the fourth response motion 10d corresponding to the fourth situation is not generated.

In this way, when the robot cleaner covers the entire area of the first map 701, the cleaning obstacle areas R1, R2, R3, R4 may be detected from the first map 701 based on the driving state information classified into the first group and the second group.

At this time, the detected cleaning obstruction areas R1, R2, R3, and R4 may partially include cells corresponding to the first group and/or cells without having driving state information.

For example, when the stored driving state information is non-straight driving for a first cell→straight driving for a second cell→non-straight driving for a third cell in a longitudinal direction, all the first, second and third cells may be detected as cleaning obstruction areas.

In addition, in an example, the cleaning obstruction areas R1, R2, R3, and R4 may be detected in a predetermined shape, for example, a rectangle. Accordingly, the shape of the area 10d in which the fourth response motion corresponding to the learned trap has been generated and the shape of the relevant cleaning obstruction area R4 may be different from each other.

Next, with reference to FIGS. 8A and 8B, a method of generating a second map based on the cleaning obstruction regions R1, R2, R3, and R4 will be described in detail.

For an example, as described in FIGS. 7A and 7B, when the cleaning obstruction areas R1, R2, R3, and R4 are detected from the first map, a second map 801 from which the cleaning obstruction areas R1, R2, R3, and R4 have been removed from the first map may be generated as illustrated in FIG. 8A.

The second map 801 may consist of only driving state information belonging to the first group, that is, only cells in which the robot cleaner has driven in a straight manner.

Since all areas in which the response motions have been generated are removed from the second map 801, there is no restriction on the driving of the robot cleaner. Accordingly, the robot cleaner may perform a fast cleaning mode (or "quick cleaning mode) using the second map 801.

In the quick cleaning mode, the robot cleaner does not visit the cleaning obstruction areas R1, R2, R3, and R4 that are not displayed on the second map 801. Thus, it is possible to complete the cleaning in a short period of time without map lag or wandering of the robot cleaner.

In addition, in the fast cleaning mode, it may be controlled to increase the driving speed of the robot cleaner than before or to change the driving line to be wider than before.

For another embodiment, when the cleaning obstruction areas R1, R2, R3, and R4 are detected from the first map, as illustrated in FIG. 8B, a second map 802 may be generated by removing all of the remaining cleaning areas except for the cleaning obstruction areas R1, R2, R3, and R4. In other words, the second map 802 may be generated by including only the cleaning obstruction area R1, R2, R3, and R4 within a boundary B of the first map.

Since only an area in which the response motion has been generated is present in the second map 802, the robot cleaner must pay attention to driving and cleaning. The robot cleaner may perform a careful cleaning mode using the second map 802.

In the careful cleaning mode, settings of the driving mode, cleaning mode, and sensor operation status of the robot cleaner 100 may be determined differently based on the driving status information recorded in each of the cleaning areas R1, R2, R3, and R4. Thus, it may be possible to perform an efficient cleaning operation in a more suitable and subdivided driving mode, cleaning mode, and operation state of the sensor for each of the cleaning areas R1, R2, R3, and R4.

Furthermore, when the careful cleaning mode is performed, some of the cleaning areas R1, R2, R3, and R4 may be excluded from the cleaning area based on the driving state information recorded in each of the cleaning areas R1, R2, R3, and R4.

Furthermore, in the careful cleaning mode, there is no limitation on the driving method of the robot cleaner in a place outside the cleaning areas R1, R2, R3, and R4 within the boundary B. Therefore, regardless of the driving order in the existing first map, when cleaning is completed in the first area R1, the third region R2 close to the first region R1 may be cleaned first.

In addition, in the careful cleaning mode, the robot cleaner may be controlled to reduce the driving speed of the robot cleaner than before, increase the suction power, and change the driving line to be narrower than before.

Meanwhile, although not shown, in another embodiment, all of the plurality of second maps 801 and 801 may be generated, and only one of them may be used as necessary.

Furthermore, at normal times (e.g., weekdays), the robot cleaner cleans the house in a quick cleaning mode using the second map 801, and at special times (e.g., weekends, before a guest visit), a plurality of second maps 801 and 801 may be sequentially used to perform a quick cleaning mode and then a careful cleaning mode.

As described above, in the present disclosure, it is possible to find a cleaning obstruction area by recording driving state information of a robot cleaner based on a map, and generate a new map that is highly usable based on the found cleaning area. The robot cleaner may drive a cleaning area by avoiding the found cleaning obstruction area using the new map, thereby satisfying cleaning completion rate and cleaning performance.

Figure 9:
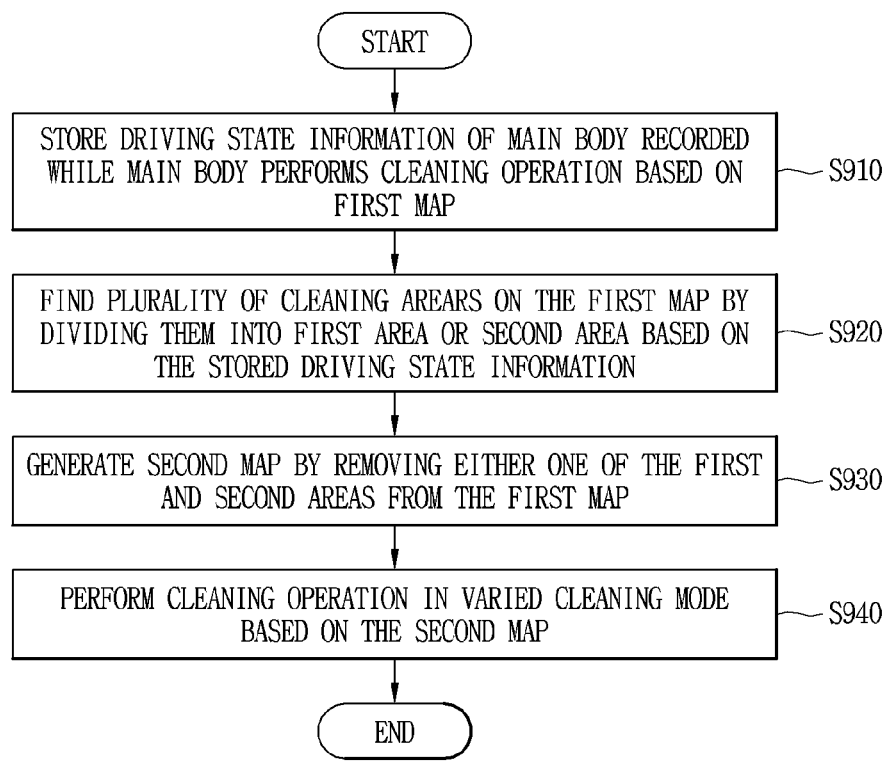
FIG. 9 is an exemplary flowchart for explaining a method of performing a cleaning operation using a map generated based on driving state information in the robot cleaner according to an embodiment of the present disclosure.

Hereinafter, a method of performing a cleaning operation using a new map generated based on driving state information will be described in detail with reference to FIG. 9.

First, while the robot cleaner 100 performs a cleaning operation based on the first map, the recorded driving state information of the main body is stored (S910).

To this end, the robot cleaner 100 may collect a current position of the robot cleaner 100 on the first map and driving state information at that position in real time while driving in a plurality of cleaning areas corresponding to the first map.

Here, the driving state information includes a case where the robot cleaner 100 drives in a straight manner without a response motion, and a case where a response motion is performed by sensing a specific situation. The driving state information may be collected in each cell unit for a plurality of cells constituting the first map.

Here, the response motion is generated in response to a situation sensed through a sensor provided in the robot cleaner 100 or based on information accessed by the robot cleaner. Specifically, the response motion, which is an operation of the driving unit 1300 to overcome the sensed situation, may include a motion of performing, for example, rotation, backward movement, change-of-direction, stop, change-of-speed, rotation-in-place, riding, and the like.

The operation of the driving unit 1300 is executed based on a control command transmitted from the controller 1800 of the robot cleaner 100.

Furthermore, in an example, the robot cleaner 100 may determine whether a response motion has been generated in consideration of whether it corresponds to a predetermined driving path other than a driving direction of the driving unit 1300. For example, even though the robot cleaner 100 drives in a non-straight manner in a specific cell of the first map, it may not be recognized as a response motion when it is to change a driving line according to a predetermined driving path.

Furthermore, in an example, the robot cleaner 100 may determine whether or not a response motion has been generated in consideration of cleaning operation information of the robot cleaner 100 in addition to the driving direction of the driving unit 1300.

Here, the cleaning operation information may include information on an amount of dust collected according to an execution of an original cleaning function of the robot cleaner 100, a rotation speed/suction power of the suction motor, and a change of the cleaning mode.

For example, when it is determined that non-straight driving is performed or stayed for a long time in the corresponding cell as the suction power is increased or the cleaning mode is changed since there is a large amount of dust in a specific point/area while the robot cleaner 100 is cleaning based on the first map, it may not be recognized as a response motion.

Furthermore, the driving state information further includes information on a number of rotations of the wheel, a direction of rotation of the wheel, and a number of changes in the rotational direction of the driving unit 1300 when a response motion of the robot cleaner is generated. This information is collected in a cell unit of the first map, and may be used as meaningful information in a cleaning obstruction area described below.

Next, the robot cleaner 100 may find a plurality of cleaning areas corresponding to the first map by dividing them into a first area and a second area based on driving state information stored therein (S920).

Here, any one of the first area and the second area denotes the above-described cleaning obstruction area. Accordingly, when the first area (the second area) is a cleaning obstruction area, the second area (first area) refers to the remaining cleaning area except for the cleaning obstruction area in the first map.

When cleaning based on the first map is completed, the robot cleaner 100 extracts an area in which a response motion has been generated based on driving state information (straight driving or response motion generation) for each of a plurality of cells constituting the first map.

The cleaning obstruction area includes an area in which a response motion has been generated. In other words, the cleaning obstruction area corresponds to an area in which a response motion has been generated or includes an area in which the response motion has been generated.

Next, the robot cleaner 100 generates a second map by removing either one of the first area and the second area from the first map (S930).

Specifically, the second map may be generated by removing a cleaning obstruction area found from the first map. Furthermore, the second map may consist of a cleaning obstruction area found from the first map and an outer boundary of the first map. Furthermore, the second map may be generated by including part of the cleaning obstruction area and not including part thereof from the first map.

Here, the preset condition may be a condition related to the driving state information of the robot cleaner recorded in the cleaning obstruction area. For example, the number of rotations of the wheel, the direction of rotation of the wheel, and the number of changes in the direction of rotation of the driving unit 1300 in cells constituting the relevant cleaning obstruction area may be included as an element for determining whether the cleaning area is included therein.

When the second map is generated as described above, the robot cleaner 100 may perform a cleaning operation in a varied cleaning mode based on the generated second map (S940).

Here, the varied cleaning mode may be applied to the remaining cleaning areas excluding the cleaning obstruction area. For example, the robot cleaner 100 may clean the remaining cleaning areas except for the cleaning obstruction area at a high speed according to the varied cleaning mode using the second map.

Furthermore, in an example, the varied cleaning mode may be applied to the cleaning obstruction area. For example, the robot cleaner 100 may determine an appropriate cleaning mode based on the driving state information in which the cleaning obstruction area is stored according to the varied cleaning mode using the second map or exclude the cleaning obstruction area from the cleaning area. At this time, when there are a plurality of cleaning obstruction areas, different cleaning modes may be set according to driving state information for each of the cleaning obstruction areas.

In addition, in another example, the varied cleaning mode may be applied to part of the cleaning obstruction area. For example, the robot cleaner 100 performs cleaning at a high speed while the current position of the robot cleaner 100 is located at a point/area out of the cleaning obstruction area according to the varied cleaning mode using the second map. Moreover, when it is sensed that the current position of the robot cleaner 100 has entered a specific cleaning obstruction area, cleaning may be performed by changing the driving speed to be slower and the suction power to be higher based on the driving state information.

Moreover, in an embodiment, when the second map is generated, the generated second map and data related to the second map may be stored in the memory of the robot cleaner 100 or in a server (not shown) communicating with the robot cleaner.

In this case, the controller 1800 of the robot cleaner 100 may call and use the stored second map and the second map-related data from the memory in response to receiving a driving signal for a cleaning operation.

Furthermore, in an example, an application of a terminal (not shown) in connection with the robot cleaner 100 may be executed to select whether to perform cleaning based on the first map or the second map through a displayed user interface (UI). The robot cleaner 100 may perform a cleaning operation by activating a cleaning mode corresponding to a map selected through the terminal.

Figure 10:
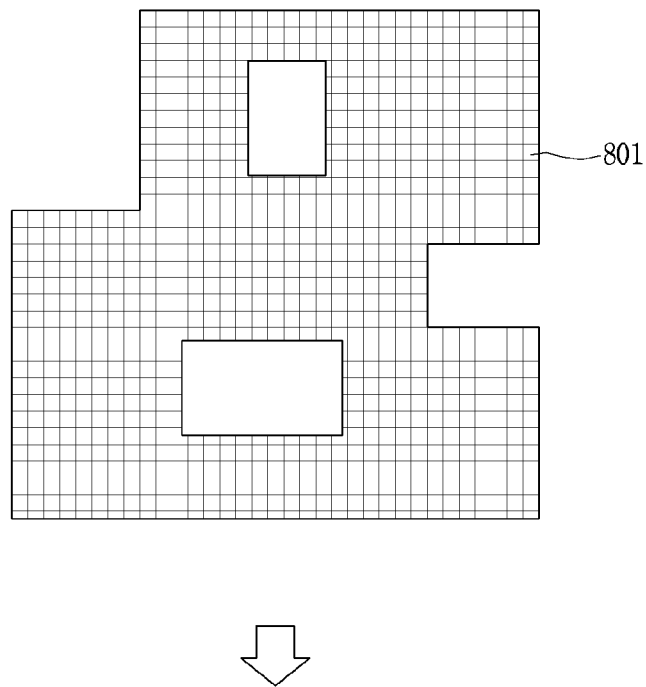
FIGS. 10, 11, and 12 are conceptual views showing embodiments related to the flowchart of FIG. 9.
Figure 10:
Figure 10:
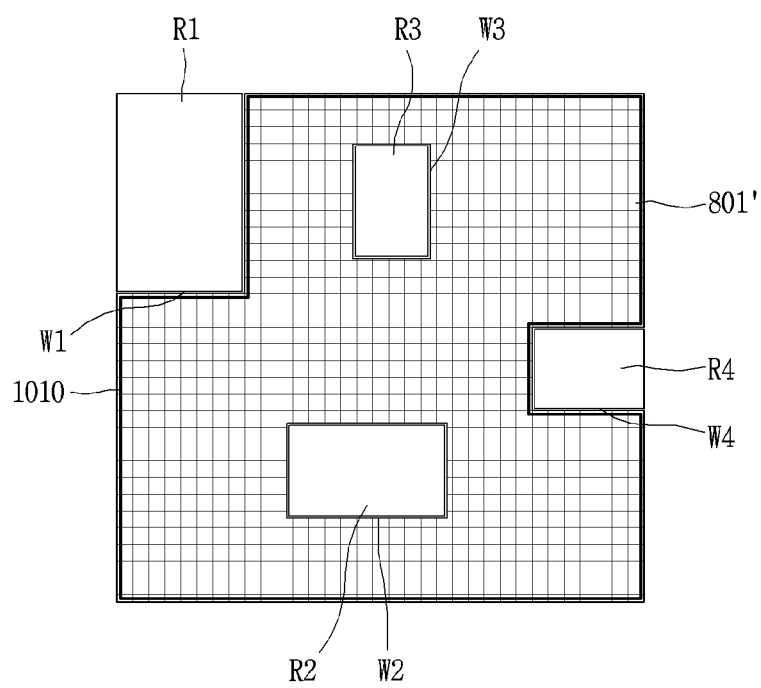
Figure 11:
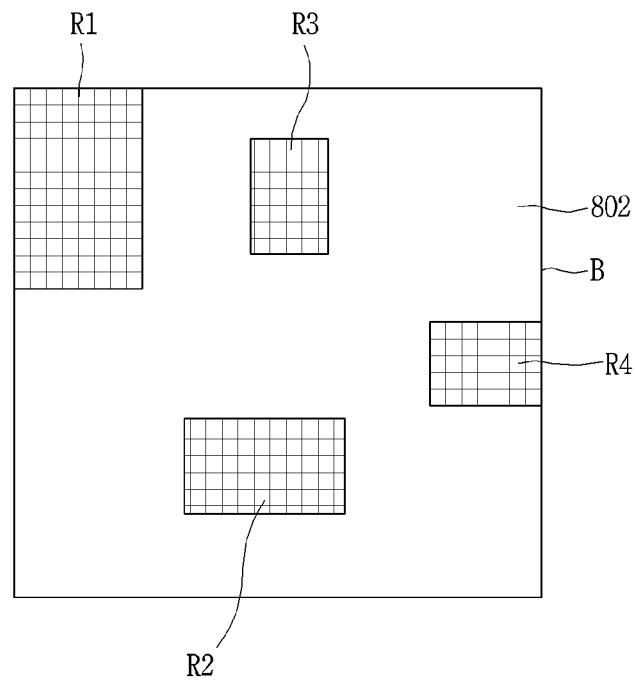
Figure 11:
Figure 11:
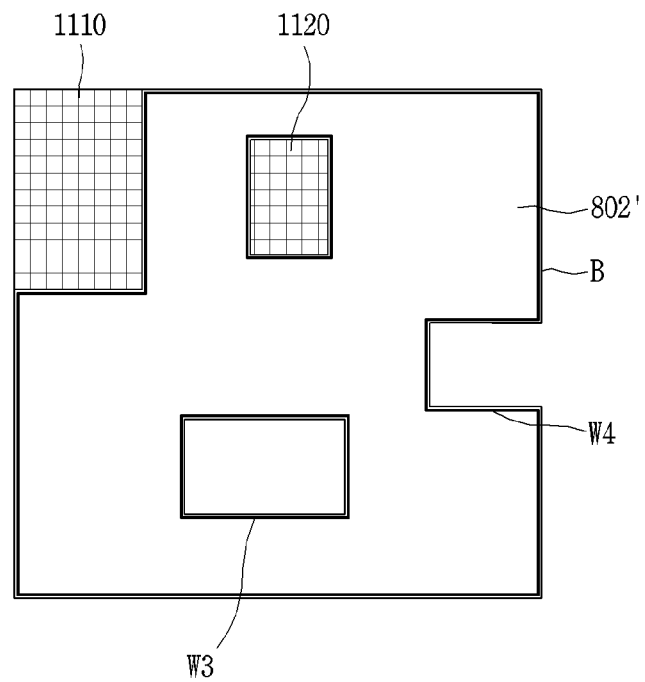
Figure 12:
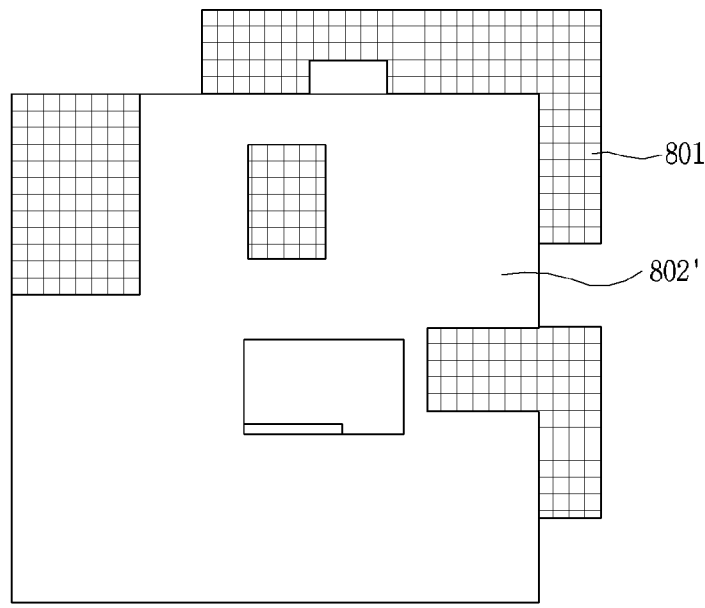
Figure 12:
Figure 12:
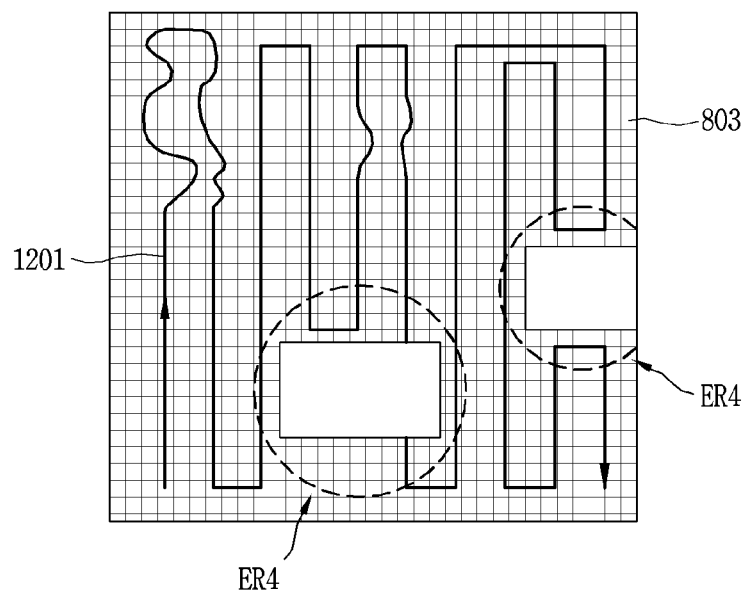

Hereinafter, FIGS. 10 to 12 are specific examples of a process (S940) of performing a cleaning operation in a varied cleaning mode based on a second map according to the flowchart of FIG. 9.

First, FIG. 10 shows an embodiment of performing a cleaning operation in a varied cleaning mode by avoiding a cleaning obstruction area based on a second map.

The controller of the robot cleaner 100 may set a virtual boundary at a boundary of an area removed from the first map, for example, the cleaning obstruction area, using the second map 801. To this end, when the cleaning operation is initiated, the robot cleaner 100 may first extract information on the cleaning obstruction areas R1, R2, R3, and R4 from the second map.

Virtual boundaries W1, W2, W3, and W4 for the cleaning obstruction areas R1, R2, R3, and R4 may be set based on the position recognition of the robot cleaner based on the second map or an external input signal.

Alternatively, virtual boundaries may be recognized in such a manner that outer cells among cells in which response motions have been generated are stored in a buffer while the robot cleaner is driving based on the first map, and the robot cleaner avoids the outer cells stored in the buffer based on the current position.

Alternatively, a virtual wall may be installed at a boundary of the cleaning obstruction area, and a magnetic sensor or the like may be activated while the robot cleaner 100 is cleaning based on the second map, thereby being controlled to drive by avoiding the virtual wall.

In addition, when part of the boundary corresponds to a boundary 1010 of the second map 801, as in the first cleaning obstruction area R1 and the fourth cleaning obstruction area R4 in FIG. 10, boundary setting for the part thereof may be omitted.

In a case where the virtual boundaries are set in this way, when the robot cleaner approaches the boundaries of the cleaning obstruction areas R1, R2, R3, and R4 while performing cleaning based on the second map, the robot cleaner performs an avoidance operation not to enter the cleaning obstruction areas R1, R2, R3, and R4.

Since such an avoidance operation is much faster and simpler than allowing the robot cleaner to enter the cleaning obstruction area R1, R2, R3, and R4 so as to perform a response motion, the robot cleaner 100 may quickly clean the cleaning areas except for the cleaning obstruction areas R1, R2, R3, and R4 using the second map 801.

In other words, the robot cleaner may perform cleaning in a "quick cleaning mode" on a cleaning area excluding the cleaning obstruction areas R1, R2, R3, and R4.

In the quick cleaning mode, the driving speed of the robot cleaner 100 may be increased, the width of the driving line may be further increased, unnecessary sensors (e.g., cliff sensor) may be switched to an inactive state to reduce battery consumption, or the sensitivity level of the sensor may be decreased than before.

Next, FIG. 11 is an embodiment in which a cleaning operation is performed on part of a cleaning obstruction area in a varied cleaning mode based on a second map.

The controller of the robot cleaner 100 may perform a cleaning operation in a varied cleaning mode using the second map 802 consisting of only the boundary B of the first map and the detected cleaning obstruction areas R1, R2, R3, R4.

At this time, there is no need to additionally set virtual boundaries for the cleaning obstruction areas R1, R2, R3, and R4. This is because an inside of the cleaning obstruction areas R1, R2, R3, and R4 is a cleaning area, and an outside of the cleaning obstruction areas R1, R2, R3, and R4 is an area that allows free driving though it is excluded from the cleaning area.

However, some of the cleaning obstruction areas that cause map lag or constrain the robot cleaner may be preferably removed from the second map or classified as a non-cleaning area. In this case, virtual boundaries must be set for some of the cleaning obstruction areas.

To this end, when cleaning is performed based on the second map, the controller of the robot cleaner 100 recognizes its current location, and then determines whether to classify the area as a cleaning area, remove it from the second map, or classify it as a non-cleaning area based on the driving state information recorded in the cleaning area.

For example, when the rotation of the driving unit 1300 of the robot cleaner 100 exceeds 5 times in a target cleaning obstruction area, it may be removed from the second map or classified as a non-cleaning area. On the contrary, when the rotation of the driving unit 1300 of the robot cleaner 100 is less than 5 times in the target cleaning obstruction area, it is recognized as a cleaning area of the second map to perform a cleaning operation in a "careful cleaning mode".

Furthermore, for example, while the driving unit 1300 of the robot cleaner 100 continuously rotates in the target cleaning obstruction area, a case where the time taken to exit the area exceeds a reference time (e.g., above 1 minute) may be removed from the second map or classified as an non-cleaning area.

In this way, in the areas R1, R2, R3, and R4 of the second map 802, a cleaning operation is performed in a "careful cleaning mode" for the areas 1110 and 1120 classified as cleaning areas. In addition, virtual boundaries W3 and W4 using virtual walls are set not to allow the robot cleaner 100 to enter the cleaning obstruction areas R2 and R4 classified as non-cleaning areas in the second map 802.

FIG. 11 is an example showing a varied second map 802' in which the cleaning area and the non-cleaning area are displayed in a classified manner.

In the "careful cleaning mode", a driving speed of the robot cleaner 100 may be reduced, a sensitivity level of a sensor such as an obstacle sensor may be increased, and a rotation speed/suction power of the suction motor may be increased.

For example, while the robot cleaner 100 cleans the areas 1110 and 1120, the driving speed may be reduced to ½ compared to the previous one, the height of obstacle determination may be reduced to ½ compared to the previous one, and the suction power may be doubled to perform a cleaning operation. This setting may be automatically returned to the previous value when the robot cleaner 100 exits the areas 1110 and 1120.

Furthermore, subsequent to cleaning completion for one area 1110, the robot cleaner may be operated to temporarily release the careful cleaning mode while moving to another area 1120, and reset the careful cleaning mode when entering the other area 1120.

On the other hand, although not shown, in an embodiment, the robot cleaner 100 may first perform cleaning in a quick cleaning mode using the second map 801 by combining the examples described in FIGS. 10 and 11, and perform cleaning in a careful cleaning mode using the second map 802 subsequent to the completion of the first cleaning.

At this time, when the battery is sensed to be less than a reference value after completing the cleaning in the quick cleaning mode, the controller of the robot cleaner 100 may return to the charging station instead of performing the careful cleaning mode. In this case, the reference value does not denote a general low-battery state, but denotes that the remaining charge amount of the battery is insufficient to complete the careful cleaning mode.

Figure 13:
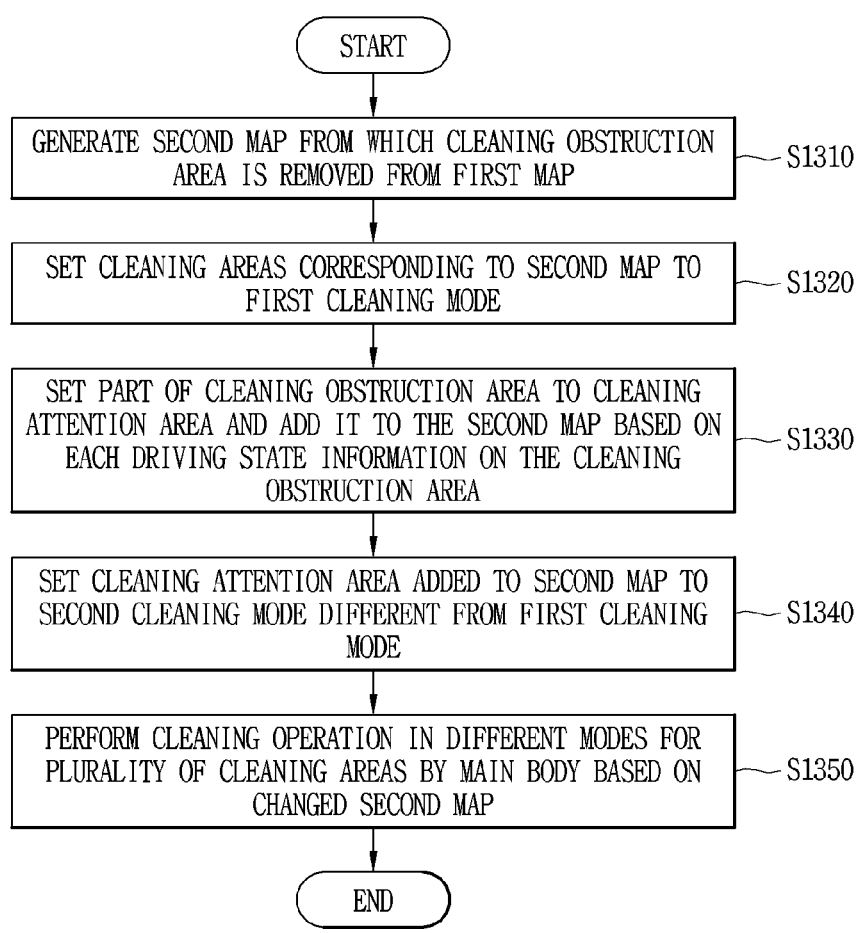
FIG. 13 is a flowchart for explaining a method of performing a cleaning operation in different cleaning modes by adding a cleaning attention area to a map generated based on driving state information in the robot cleaner according to an embodiment of the present disclosure.

Hereinafter, FIGS. 12 and 13 are modified embodiments of the process (S940) of performing a cleaning operation in a varied cleaning mode based on a second map according to the flow chart of FIG. 9. Accordingly, it should be noted that even if the configuration is not specifically described in FIGS. 12 and 13, the configurations described with reference to FIG. 9 may be similarly applied to FIGS. 12 and 13.

FIG. 12 shows a view in which a varied second mane 803 is generated by layering a second map 801 consisting of part of cleaning obstruction areas ("cleaning attention areas") and areas excluding the cleaning obstruction areas ("quick cleaning areas") based on a second map 802' consisting of only the cleaning obstruction areas or partially consisting of the cleaning obstruction areas.

The varied second map 803 may include a cleaning attention area, a quick cleaning area, and non-cleaning areas ER4 and ER4.

The robot cleaner 100 may perform a cleaning operation in the careful cleaning area and the quick cleaning area in different variable cleaning modes based on the varied second map. Furthermore, a virtual boundary using a virtual wall or the like may be set so as not to enter the non-cleaning areas ER4 and ER4 when the driving path 1201 of the robot cleaner 100 is set.

Hereinafter, FIG. 13 is a flowchart for explaining a method of performing a cleaning operation in different cleaning modes by adding a cleaning attention area to a second map generated based on driving state information of the robot cleaner.

First, the robot cleaner 100 performs driving/cleaning based on the first map, and generates a second map in which cleaning obstruction areas are removed from the first map (S1310).

Next, the controller of the robot cleaner 100 sets cleaning areas corresponding to the generated second map, straight driving areas, as a first cleaning mode (S1320).

Here, the first cleaning mode may be a driving manner different from a zigzag manner. Furthermore, the first cleaning mode may be a cleaning mode in which the driving speed is faster compared to the existing one, some sensors are deactivated or a sensitivity level thereof is reduced.

Next, the controller of the robot cleaner 100 sets part of the cleaning area as a cleaning attention area and adds it to the second map (S1330). At this time, an area of the first map that is not included in the second map may be classified as a non-cleaning area, and completely removed from the cleaning area.

The cleaning attention areas added to the second map may be classified into different cleaning attention areas based on the driving state information of the robot cleaner in the relevant areas.

When the second map is varied in this way, the controller of the robot cleaner sets the cleaning attention area added to the second map to a second cleaning mode different from the set first cleaning mode (S1340).

Specifically, for example, based on the driving state information, a cleaning obstruction area in which the rotation of the robot cleaner exceeds 5 times is classified as a non-cleaning area. In addition, a cleaning obstruction area in which a motion corresponding to vision bumping occurs due to wheel slip of the robot cleaner based on the driving state information is classified as a non-cleaning area because it causes map lag.

In a first cleaning caution area where the robot cleaner rotates less than 5 times and a response motion such as obstacle avoidance has been generated, it is set to a careful cleaning mode having a half of the driving speed of the robot cleaner, a half of the height of the obstacle determination, and about two times of the suction power of the suction motor.

Furthermore, in a second cleaning area where the robot cleaner has a lot of shaking and the floor is uneven, it is set to a careful cleaning mode having a half of the driving speed of the robot cleaner, and a minimum value, for example, one-fifth of the height of obstacle determination.

In addition, a third cleaning attention area in which a cliff response motion of the robot cleaner, a wheel falling off is generated may have a dangerous shape, and is set to a careful cleaning mode having a minimum value, for example, one-fifth of the driving speed of the robot cleaner, and a half of the height of obstacle determination.

As described above, in the present disclosure, the quick cleaning area is set to a quick cleaning mode, and the cleaning attention area is is set to a cleaning mode in which at least one of a driving speed of the robot cleaner, a sensitivity level or reference value of the sensor, and a rotation speed/suction power of the suction motor provided in the main body is changed based on driving state information recorded in each cleaning obstruction area.

Meanwhile, in an example, the setting of the second cleaning mode may be performed when the robot cleaner 100 is close to the relevant cleaning attention area. To this end, the robot cleaner 100 must determine its current position in real time based on the second map.

Next, the controller of the robot cleaner controls the robot cleaner body to perform a cleaning operation in different cleaning modes for the plurality of cleaning areas based on the changed second map (S1350).

Specifically, the controller of the robot cleaner may increase the sensitivity level of at least one sensor (or reduce the reference value of a sensor) provided in the robot cleaner body than before while performing a cleaning operation on a cleaning attention region using the changed second map.

Furthermore, the controller of the robot cleaner may recover or decrease the changed sensitivity level of the sensor (or recover or increase the reference value of the sensor) in response to sensing that the current position of the robot cleaner is out of the cleaning area.

The controller of the robot cleaner may output a control command for increasing a rotation speed of the suction motor provided in the robot cleaner body than before while performing a cleaning operation for the cleaning attention area using the changed second map.

Furthermore, the controller of the robot cleaner may further reduce the driving speed of the main body by the driving unit than before while performing a cleaning operation for the cleaning attention area using the changed second map.

Figure 14A:
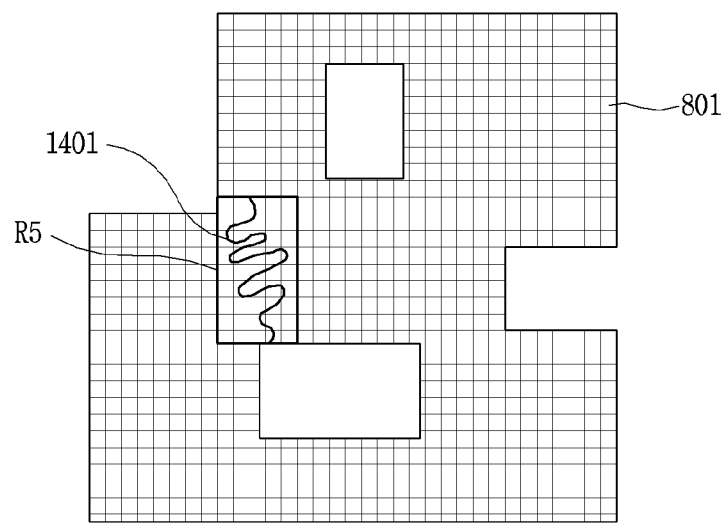
FIGS. 14A and 14B are conceptual views for explaining updating a map from which a cleaning obstruction area is removed based on a change of driving state information in the robot cleaner according to an embodiment of the present disclosure.
Figure 14A:
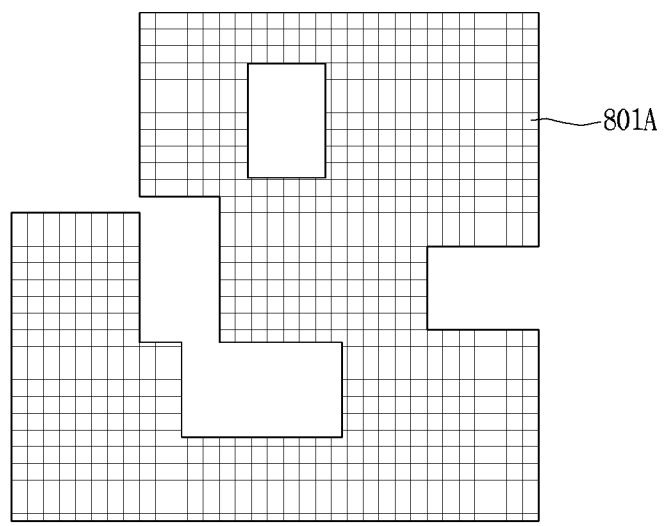
Figure 14B:
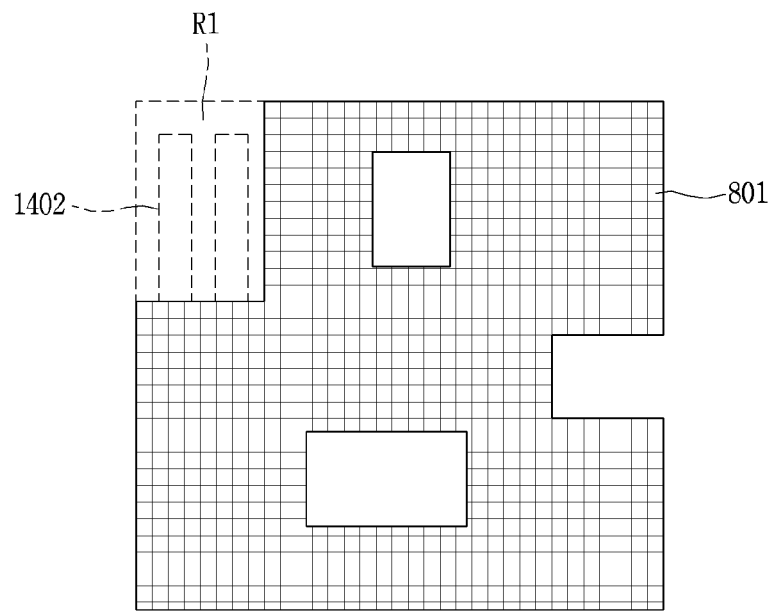
Figure 14B:
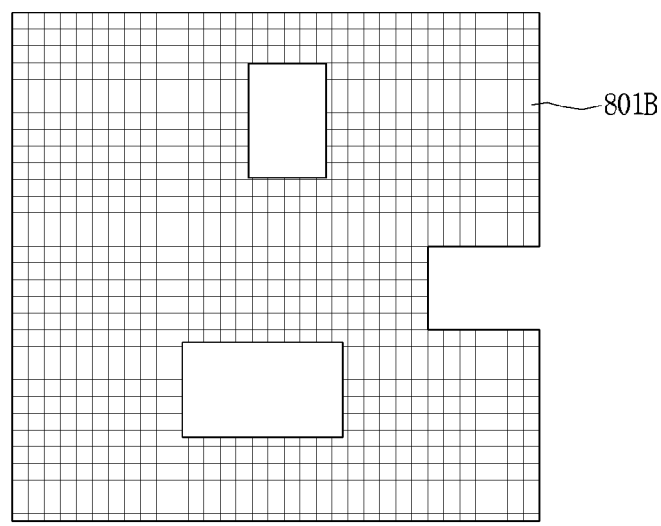

As a last example, FIGS. 14A and 14B show an example of updating a map in which a cleaning obstruction area is added or removed based on a change in driving state information collected based on a first map or a second map.

The robot cleaner according to the present disclosure may continuously collect driving state information of the main body as described in detail above while performing cleaning based on the second map. Accordingly, it may be possible to additionally find a cleaning obstruction area or change the existing cleaning obstruction area to a quick cleaning area or a non-cleaning area.

For example, referring to FIG. 14A, when a complicated response motion is generated on the driving path 1401 while cleaning is performed based on the second map 801 from which the cleaning obstruction area has been removed, the relevant area R5 is now not suitable for performing the cleaning operation in the quick cleaning mode. Accordingly, the updated second map 801A may be generated by removing the relevant are R5 from the second map 801.

Furthermore, for example, referring to FIG. 14B, subsequent to the generation of the second map, when driving state information is recorded as there is no response motion in the area R1 removed from the second map 801 based on the existing first map, a cleaning operation may now be performed for the area R1 in a quick cleaning mode. Accordingly, the updated second map 801B may be generated by adding the relevant region R1 to the second map 801.

As described above, a robot cleaner and an operation method thereof according to an embodiment of the present disclosure may generate a map that is robust to various environmental variables and is highly usable without relying on a sensor. In addition, since it may be possible to find a cleaning obstruction area from an existing map with only the driving status information of the robot cleaner without having a sensor, and a new cleaning mode may be developed and set based thereon, thereby allowing both cleaning efficiency and cleaning time to be satisfied. For example, it may be possible to quickly clean the remaining areas except for the cleaning obstruction area that it takes a long time to clean and causes the map to slip. Moreover, it may be possible to reduce the driving speed during the cleaning of the found cleaning obstruction area, increase the sensitivity level of the sensor, and increase the suction power, thereby improving the performing of cleaning. In other words, it may be possible to shorten the cleaning time and improve the cleaning efficiency at the same time.

The present disclosure described above may be implemented as computer-readable codes on a program-recorded medium. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the controller 1800. The above detailed description should not be limitedly construed in all aspects and should be considered as illustrative. The scope of the present invention should be determined by rational interpretation of the appended claims, and all changes within the scope of equivalents of the present invention are included in the scope of the present disclosure.

What is claimed is:

1. A robot cleaner, comprising:
a driving unit that moves a main body;
a memory that stores driving state information of the driving unit recorded while performing a cleaning operation based on a first map; and
a controller that finds a plurality of cleaning areas corresponding to the first map by dividing them into a first area and a second area based on the stored driving state information,
wherein the controller generates a second map by removing either one of the first area and the second area from the first map, and performs a cleaning operation in a varied cleaning mode based on the generated second map,
wherein the controller sets at least part of a cleaning area of the first map that is not included in the second map as a cleaning attention area, and adds the cleaning attention area to the second map based on the stored driving state information, and
wherein the controller increases a sensitivity level of at least one sensor provided in the main body while performing a cleaning operation in the cleaning attention area using the second map.

2. The robot cleaner of claim 1, wherein the controller sets a virtual boundary in an area removed from the first map using the second map, and controls the driving unit to perform a cleaning operation by avoiding the set virtual boundary.

3. The robot cleaner of claim 1, wherein the controller controls the driving unit to perform a cleaning operation in a first cleaning mode for a cleaning area included in the second map, and perform a cleaning operation in a second cleaning mode different from the first cleaning mode for a cleaning area of the first map that is not included in the second map.

4. The robot cleaner of claim 3, wherein the second map comprises cleaning areas in which cleaning obstruction areas have been removed from the first map based on the stored driving state information, and
the first cleaning mode is a quick cleaning mode, and the second cleaning mode is determined differently according to driving state information recorded in each of the cleaning obstruction areas.

5. The robot cleaner of claim 4, wherein the driving state information recorded in each of the cleaning obstruction areas comprises at least one of a driving path, a driving speed of the main body recorded in each of the cleaning obstruction areas, a number of wheel rotations of the main body, a number of changes in a direction of the main body, and a time taken to exit the cleaning obstruction areas.

6. The robot cleaner of claim 1, wherein the controller recovers or decreases the sensitivity level of the sensor in response to sensing that the main body is out of the cleaning attention area.

7. The robot cleaner of claim 1, wherein the controller outputs a control command for increasing a rotation speed of a suction motor provided in the main body while performing a cleaning operation for the cleaning attention area using the second map.

8. The robot cleaner of claim 1, wherein the controller decreases a driving speed of the main body by the driving unit while performing a cleaning operation in the cleaning attention area using the second map.

9. The robot cleaner of claim 1, wherein the generated second map and data related to the second map are stored in the memory, and
the controller calls the stored second map and the data related to the second map from the memory in response to receiving a driving signal for the cleaning operation.

10. A method of operating a robot cleaner, the method comprising:
storing driving state information of a main body recorded while performing a cleaning operation based on a first map;
finding a plurality of cleaning areas corresponding to the first map by dividing them into a first area and a second area based on the stored driving state;
generating a second map by removing either one of the first area and the second area from the first map; and
performing a cleaning operation in a varied cleaning mode based on the generated second map,
wherein said generating of the second map comprises:
removing a cleaning obstruction area from the first map based on the stored driving state information; and
setting at least part of a cleaning area of the first map that is not included in the second map as a cleaning attention area and adding the cleaning attention area to the second map based on the stored driving state information, and
wherein while performing a cleaning operation in the cleaning attention area using the second map, a sensitivity level of at least one sensor provided in a main body is increased.

11. The method of claim 10, wherein said performing a cleaning operation in a varied cleaning mode comprises:
setting cleaning areas other than the cleaning attention area in the second map to a first cleaning mode, and setting the cleaning attention area to a second cleaning mode different from the first cleaning mode; and
excluding an area of the first map that is not included in the second map from the cleaning area.

12. The method of claim 11, wherein
the first cleaning mode is a quick cleaning mode, and
the second cleaning mode is a cleaning mode in which at least one of a driving speed of the main body, a sensitivity level of a sensor provided in the main body, and a rotation speed of a suction motor provided in the main body is changed based on driving state information recorded in each cleaning obstruction area.

* * * * *